United States Patent
Shin et al.

(10) Patent No.: US 12,089,261 B2
(45) Date of Patent: Sep. 10, 2024

(54) METHOD AND DEVICE FOR TRANSMITTING AND RECEIVING SIGNAL IN WIRELESS COMMUNICATION SYSTEM

(71) Applicant: LG Electronics Inc., Seoul (KR)

(72) Inventors: Seokmin Shin, Seoul (KR); Suckchel Yang, Seoul (KR); Seonwook Kim, Seoul (KR); Joonkui Ahn, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 17/598,102

(22) PCT Filed: Mar. 30, 2020

(86) PCT No.: PCT/KR2020/004327
§ 371 (c)(1),
(2) Date: Sep. 24, 2021

(87) PCT Pub. No.: WO2020/197351
PCT Pub. Date: Oct. 1, 2020

(65) Prior Publication Data
US 2022/0191936 A1 Jun. 16, 2022

(30) Foreign Application Priority Data

Mar. 28, 2019 (KR) .................. 10-2019-0036405
May 3, 2019 (KR) .................. 10-2019-0052577

(51) Int. Cl.
*H04W 74/0833* (2024.01)
*H04W 74/00* (2009.01)

(52) U.S. Cl.
CPC ..... *H04W 74/0833* (2013.01); *H04W 74/004* (2013.01)

(58) Field of Classification Search
CPC .......... H04W 74/0833; H04W 74/004; H04W 74/0808
See application file for complete search history.

(56) References Cited

U.S. PATENT DOCUMENTS

2019/0132882 A1* 5/2019 Li ..................... H04W 74/0833

FOREIGN PATENT DOCUMENTS

WO  WO2018062841       4/2018
WO  WO-2018062841 A1 *  4/2018  ......... H04L 27/2607

OTHER PUBLICATIONS

International Search Report and Written Opinion in International Appln. No. PCT/KR2020/004327, dated Jul. 23, 2020, 15 pages (with English translation).

(Continued)

*Primary Examiner* — Mohammad S Anwar
(74) *Attorney, Agent, or Firm* — Fish & Richardson P.C.

(57) ABSTRACT

A method and device for transmitting and receiving a signal in a wireless communication system, according to one embodiment of the present invention, comprises transmitting a physical random access channel (PRACH) and receiving a random access response (RAR) on the basis of the PRACH, wherein the PRACH is transmitted via one random access channel (RACH) occasion (RO) of ROs in a RACH slot, timing gap durations exist between the ROs, and the same timing gap durations can be set even if a PRACH format and/or a subcarrier spacing (SCS) used for the PRACH are changed.

9 Claims, 22 Drawing Sheets

(56) References Cited

OTHER PUBLICATIONS

LG Electronics, "Initial access and mobility for NR-U," R1-1902041, Presented at 3GPP TSG RAN WG1 #96, Athens, Greece, Feb. 25-Mar. 1, 2019, 22 pages.
Nokia & Nokia Shanghai Bell, "Initial Access Signals and Channels for NR-U," R1-1902435, 3GPP TSG RAN WG1 Meeting #96, Athens, Greece, Feb. 25-Mar. 1, 2019, 29 pages.
Samsung, "Enhancements to Initial Access Procedure for NR-U," R1-1902258, Presented at 3GPP TSG RAN WG1 Meeting #96, Athens, Greece, Feb. 25-Mar. 1, 2019, 10 pages.
Vivo, "Discussion on enhancements to initial access procedure," R1-1901676, Presented at 3GPP TSG RAN WG1 #96, Athens, Greece, Feb. 25-Mar. 1, 2019, 7 pages.

* cited by examiner (a) Carrier aggregation between L-band and U-band (b) Standalone U-band(s)

(a)

(b)

(a)

(b)

METHOD AND DEVICE FOR TRANSMITTING AND RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2020/004327, filed on Mar. 30, 2020, which claims the benefit of Korean Application Nos. 10-2019-0052577, filed on May 3, 2019, and 10-2019-0036405, filed on Mar. 28, 2019. The disclosures of the prior applications are incorporated by reference in their entirety.

TECHNICAL FIELD

The present disclosure relates to a method and device for use in a wireless communication system, and more particularly to a random access method and device for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

Provided are a method and apparatus for performing a random access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In accordance with an aspect of the present disclosure, a method for enabling a user equipment (UE) to transmit and receive signals in a wireless communication system may include transmitting a physical random access channel (PRACH), and receiving a random access response (RAR) based on the PRACH. The PRACH is transmitted through one RACH occasion (RO) from among a plurality of RACH occasions (ROs) included in a random access channel (RACH) slot, a plurality of time gap durations is present between the ROs, and the time gap durations are configured to be the same value regardless of changes in a subcarrier spacing (SCS) used in the PRACH and/or a PRACH format.

In accordance with another aspect of the present disclosure, a user equipment (UE) configured to transmit and receive signals in a wireless communication system may include at least one transceiver; at least one processor, and at least one memory operatively connected to the at least one processor, and configured to store instructions such that the at least one processor performs specific operations by executing the instructions. The specific operations include transmitting a physical random access channel (PRACH), and receiving a random access response (RAR) based on the PRACH, wherein the PRACH is transmitted through one RACH occasion (RO) from among a plurality of RACH occasions (ROs) included in a random access channel (RACH) slot, a plurality of time gap durations is present between the ROs, and the time gap durations are configured to be the same value regardless of changes in a subcarrier spacing (SCS) used in the PRACH and/or a PRACH format.

In accordance with another aspect of the present disclosure, a method for enabling a base station (BS) to transmit and receive signals in a wireless communication system may include receiving a physical random access channel (PRACH); and transmitting a random access response (RAR) based on the PRACH, wherein the PRACH is transmitted through one RACH occasion (RO) from among a plurality of RACH occasions (ROs) included in a random access channel (RACH) slot, a plurality of time gap durations is present between the ROs, and the time gap durations are configured to be the same value regardless of changes in a subcarrier spacing (SCS) used in the PRACH and/or a PRACH format.

In accordance with another aspect of the present disclosure, a base station (BS) configured to transmit and receive signals in a wireless communication system may include at least one transceiver, at least one processor, and at least one memory operatively connected to the at least one processor, and configured to store instructions such that the at least one processor performs specific operations by executing the instructions, wherein the specific operations include receiving a physical random access channel (PRACH); and transmitting a random access response (RAR) based on the PRACH. The PRACH is transmitted through one RACH occasion (RO) from among a plurality of RACH occasions (ROs) included in a random access channel (RACH) slot, a plurality of time gap durations is present between the ROs, and the time gap durations are configured to be the same value regardless of changes in a subcarrier spacing (SCS) used in the PRACH and/or a PRACH format.

In accordance with another aspect of the present disclosure, a device configured to operate for a user equipment (UE) may include at least one processor; and at least one memory operatively connected to the at least one processor, and configured to store instructions such that the at least one processor performs specific operations by executing the instructions. The specific operations include transmitting a physical random access channel (PRACH), and receiving a random access response (RAR) based on the PRACH, wherein the PRACH is transmitted through one RACH occasion (RO) from among a plurality of RACH occasions (ROs) included in a random access channel (RACH) slot, a plurality of time gap durations is present between the ROs, and the time gap durations are configured to be the same value regardless of changes in a subcarrier spacing (SCS) used in the PRACH and/or a PRACH format.

In accordance with another aspect of the present disclosure, a computer-readable storage medium may store instructions which when executed by at least one processor, cause the processor to perform specific operations. The specific operations may include transmitting a physical random access channel (PRACH), and receiving a random access response (RAR) based on the PRACH. The PRACH is transmitted through one RACH occasion (RO) from among a plurality of RACH occasions (ROs) included in a random access channel (RACH) slot, a plurality of time gap durations is present between the ROs, and the time gap durations are configured to be the same value regardless of changes in a subcarrier spacing (SCS) used in the PRACH and/or a PRACH format.

In the methods and the devices, the time gap durations may be configured in units of orthogonal frequency division multiplexing (OFDM) symbols.

In the methods and the devices, the time gap durations may be derived based on information about a start time point of an initial RACH occasion (RO) from among the ROs and information about a start time point of a second RO from the start time point of the initial RO.

In the methods and the devices, the time gap durations may be located before a start time point of an initial RACH occasion (RO) within the RACH slot.

In the methods and the devices, the transmitting the PRACH may include randomly selecting a backoff counter value based on a contention window size, reducing the backoff counter value one by one based on information about an unlicensed band (U-band) that is in an idle state, and transmitting the PRACH through the one RO based on information indicating that the backoff counter value reaches zero '0'.

In the methods and the devices, after the backoff counter value reaches '1', the backoff counter value may be reduced to zero '0' when the unlicensed band (U-band) is in the idle state during a predetermined time located just before a RACH occasion (RO) selected by the UE, and may be kept at '1' when the unlicensed band (U-band) is in a busy state during a predetermined time located just before the RO selected by the UE.

In the method or the device, the communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication device may perform a random access procedure more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
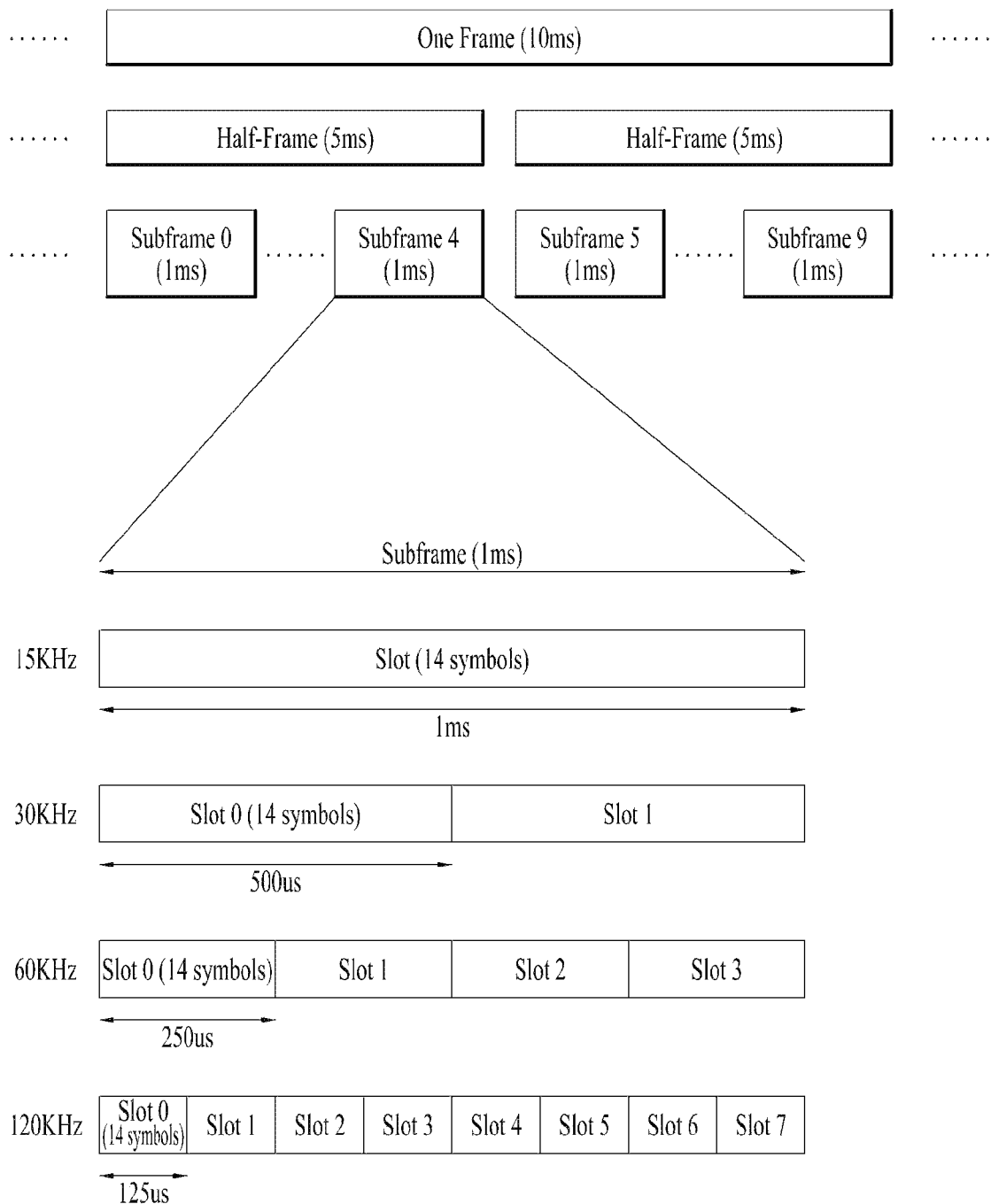
FIG. 1 illustrates a radio frame structure.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
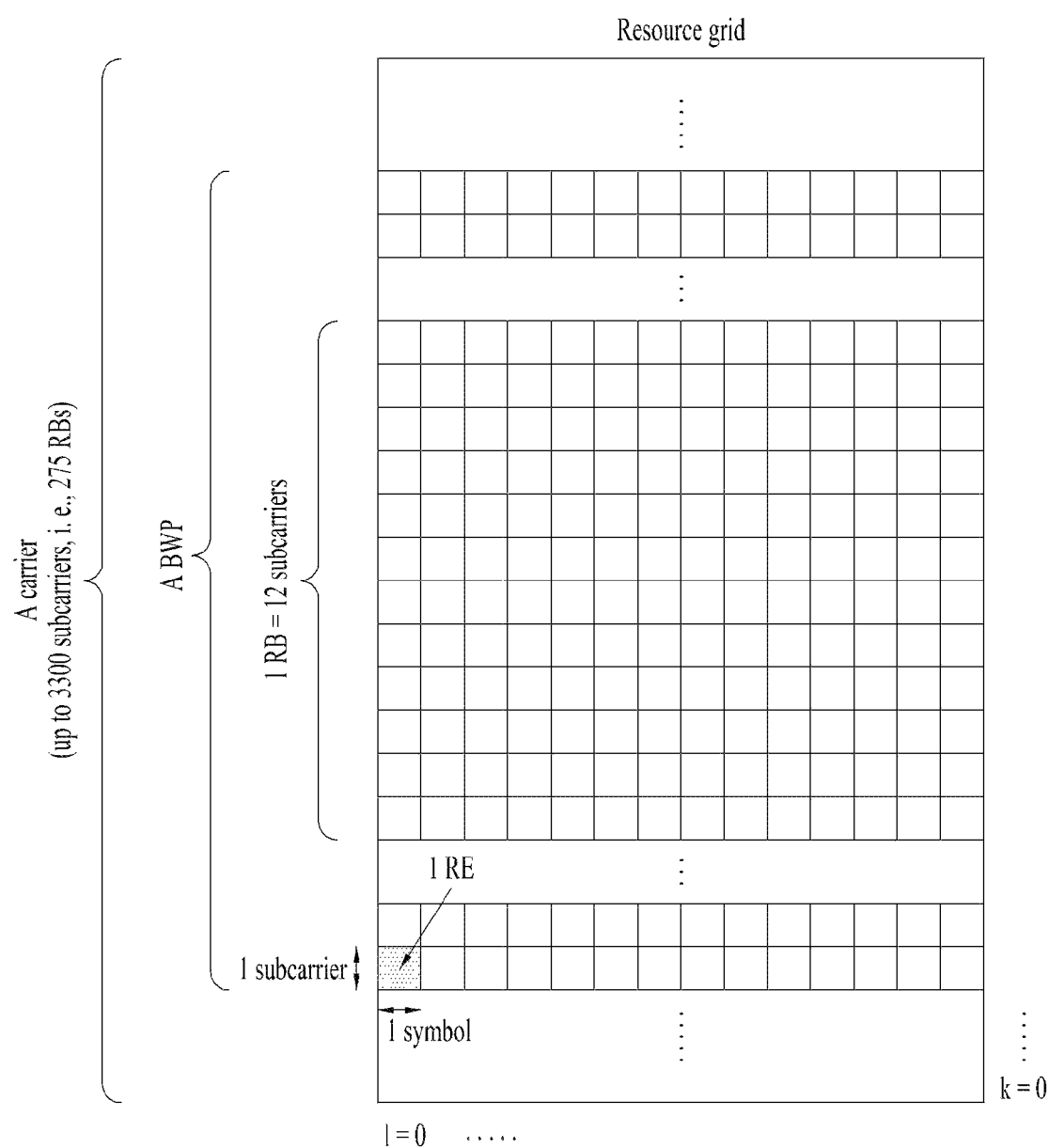
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
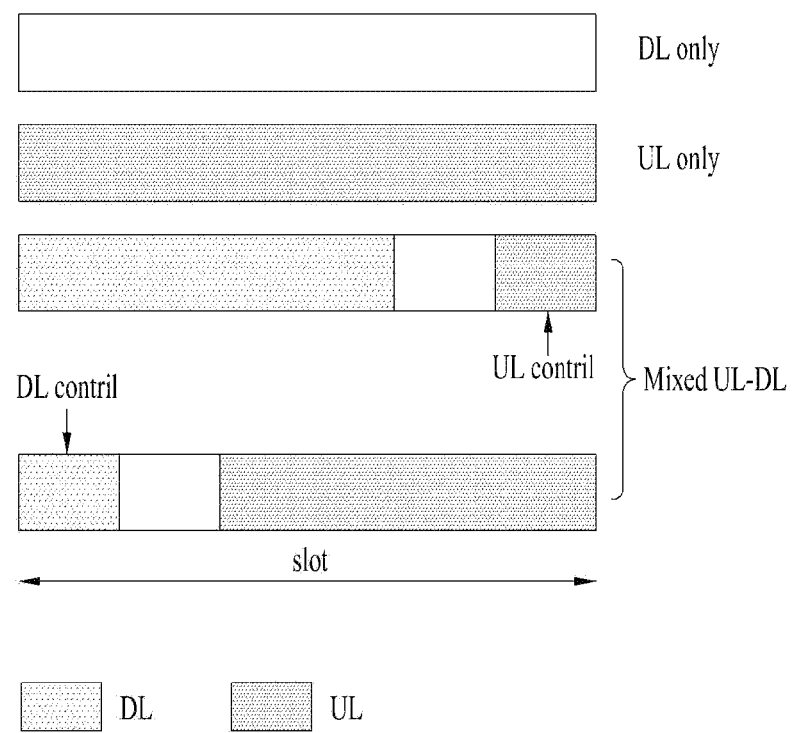
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   -DL region+Guard period (GP)+UL control region
   -DL control region+GP+UL region
   *DL region: (i) DL data region, (ii) DL control region+DL data region
   *UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

1. Wireless Communication System Supporting Unlicensed Band

Figure 4:
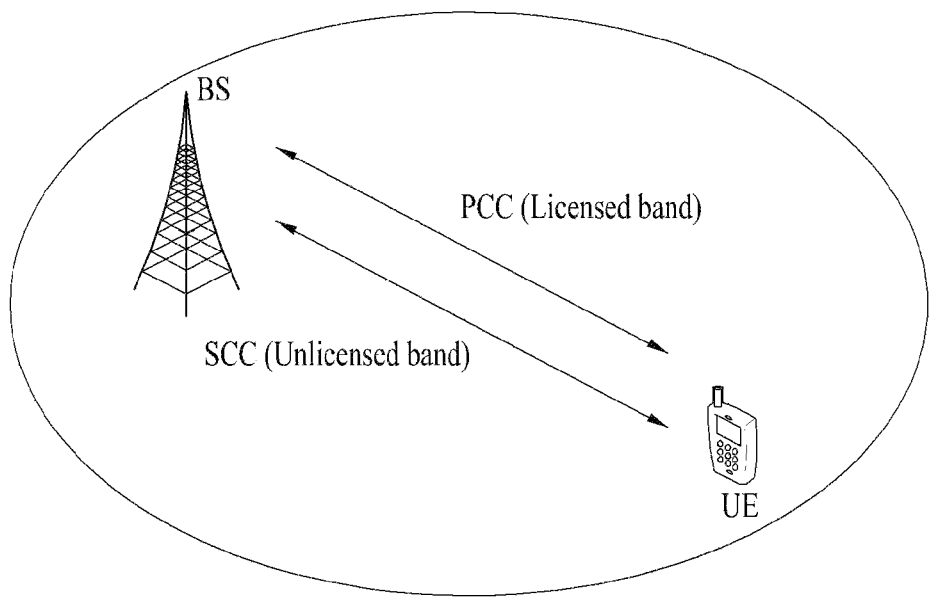
FIG. 4 illustrates a wireless communication system supporting an unlicensed band.
Figure 4:
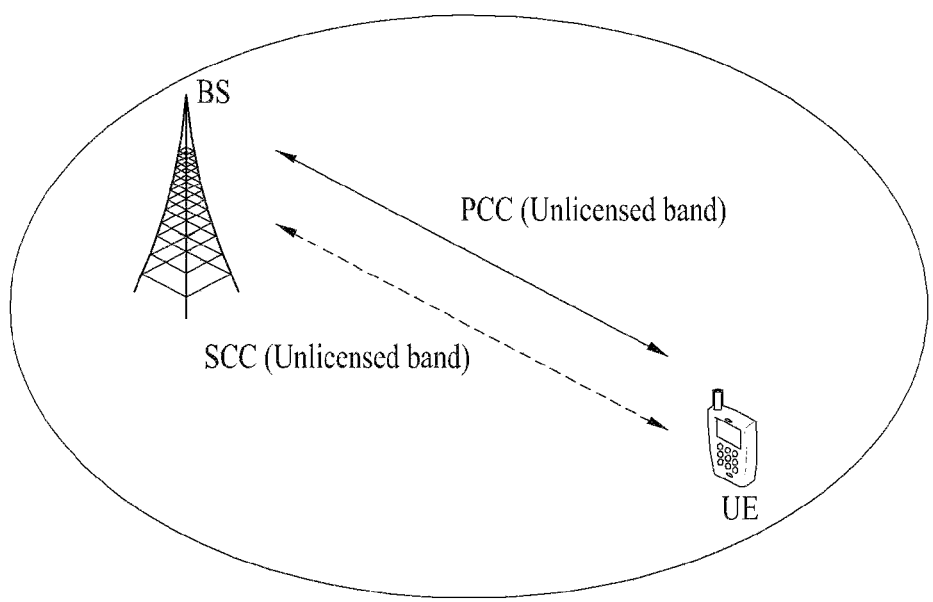

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 4(a), the LCC may be configured as a primary CC (PCC) and the UCC may be configured as a secondary CC (SCC). As illustrated in FIG. 4(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G system named New RAT (NR). The NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, subcarrier spacing (SCS), and so on). In recent years, data traffic has significantly increased with the advent of smart devices. Thus, the 3GPP NR system has also considered the use of an unlicensed band for cellular communication as in LAA of the legacy 3GPP LTE system. However, unlike the LAA, a NR cell in the unlicensed-band (NR U-cell) aims to support standalone operation. For example, PUCCH, PUSCH, and PRACH transmissions at the UE may be supported.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 5:
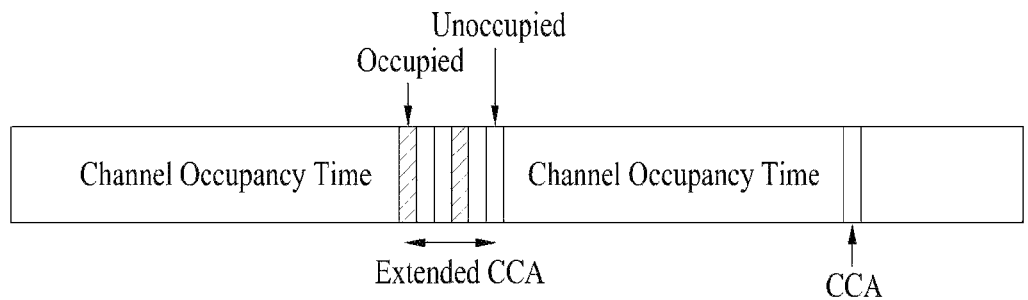
FIG. 5 illustrates a method of occupying resources in an unlicensed band.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.
Method of Transmitting DL Signal in Unlicensed Band To transmit a DL signal in an unlicensed band, the BS may indicate the configuration of OFDM symbols used in subframe #n to the UE by signaling. The term subframe may be replaced with slot or time unit (TU).

Figure 6:
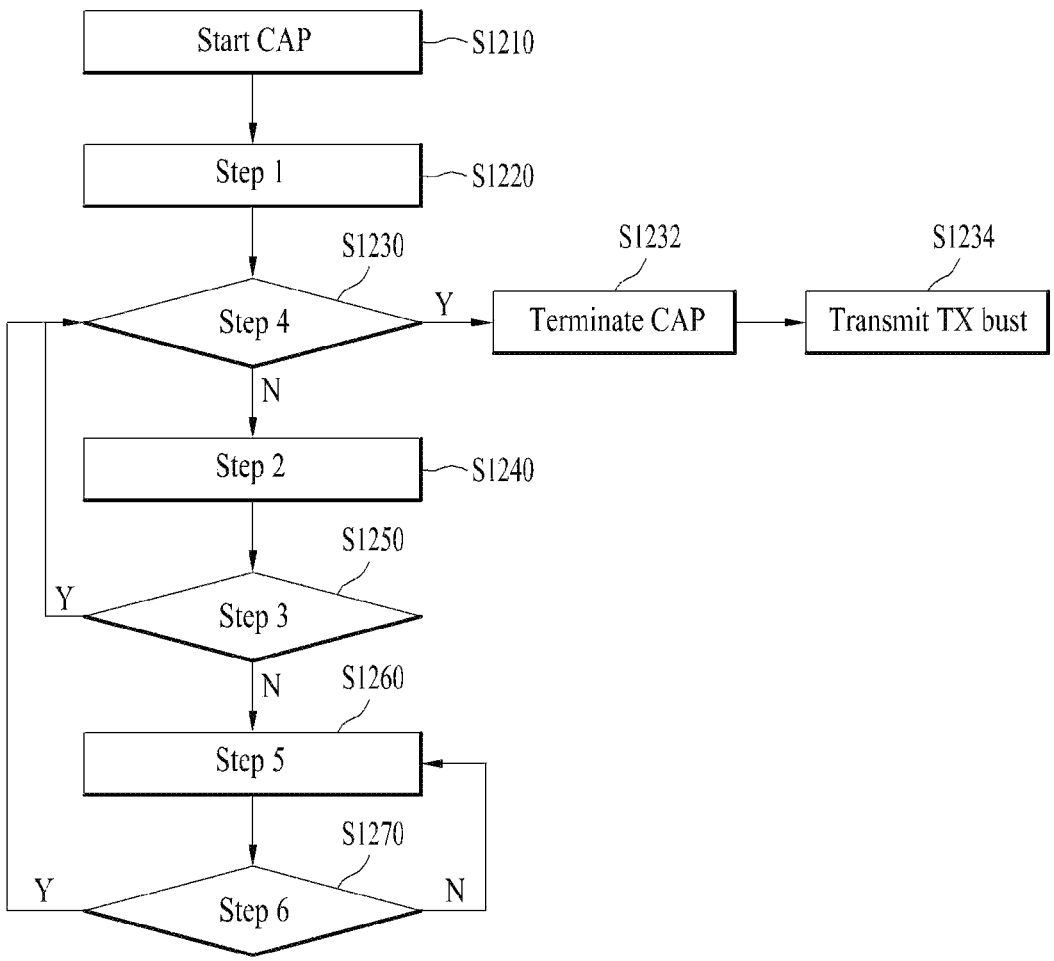
FIGS. 6 and 7 are flowcharts illustrating channel access procedures (CAPs) for signal transmission in an unlicensed band.

The BS may perform one of the following unlicensed band access procedures (e.g., CAPs) to transmit a DL signal in the unlicensed band.
(1) First DL CAP Method FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value Ninit (S1220). Ninit is a random value selected from the values between 0 and CWp. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell (s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration Td (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following mp consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that mp, a minimum CW, a maximum CW, a maximum channel occupancy time (MCOT), and an allowed CW size applied to a CAP vary according to channel access priority classes.

TABLE 4

| Channel Access Priority Class (p) | $m_p$ | $CW_{min,pF}$ | $CW_{max,p}$ | $T_{mcotp}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission (s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.
(2) Second DL CAP Method The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$(=16 μs) following one sensing slot duration $T_{sl}$ (=9 μs).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 7:
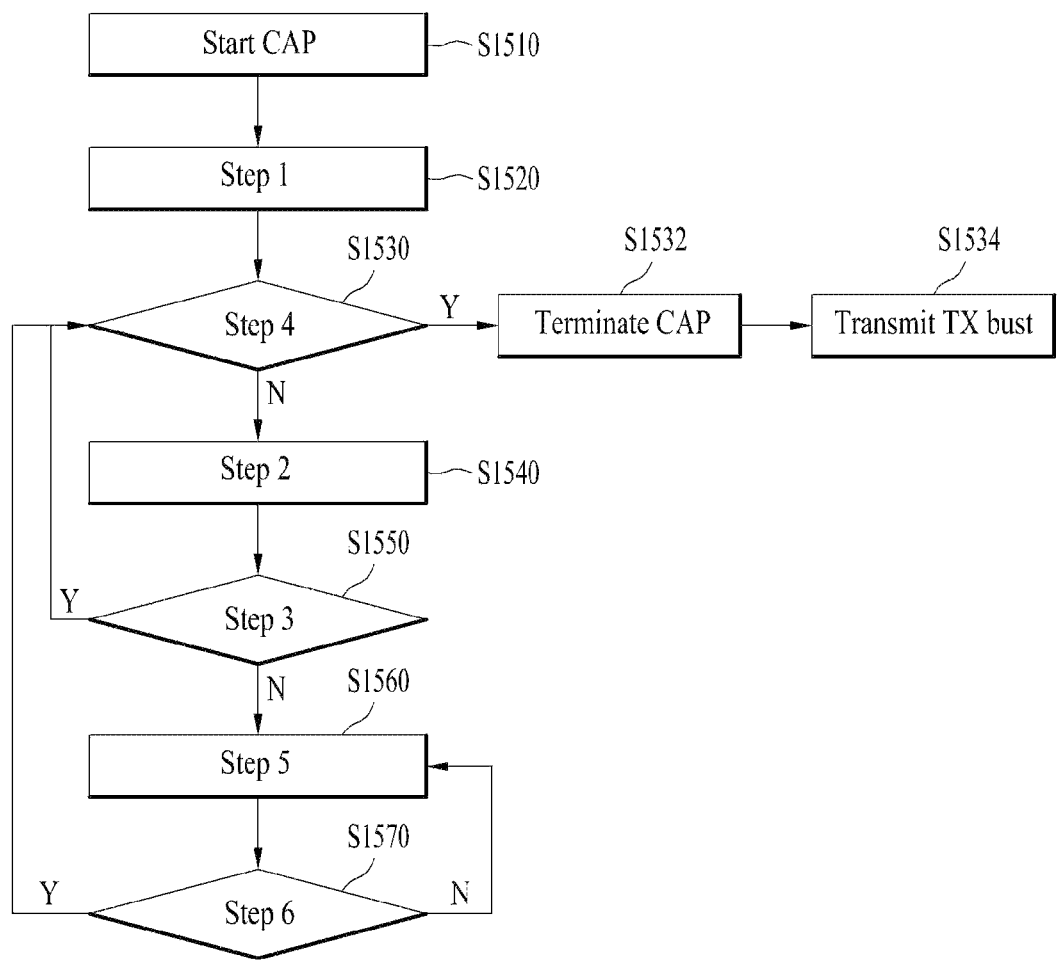

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration Td (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and mp consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of mp, a minimum CW, a maximum CW, a maximum channel occupancy time (MCOT), and allowed CW sizes, which are applied to the CAP, vary depending on channel access priority classes.

TABLE 5

| Channel Access Priority Class (p) | $m_p$ | $CW_{min,p}$ | $CW_{max,p}$ | $T_{ulmot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to CWmin,p for every priority class p∈{1,2,3,4}. Otherwise, the UE may increase $CW_p$ for every priority class p∈{1,2,3,4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0, n_1, \ldots n_w$, starting from the subframe (or slot) $n_0$ without a gap (the subframe (or slot) $n_w$ is the most recent subframe (or slot) before a subframe (or slot) $n_g$−3 in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 μs immediately followed by one slot duration $T_{sl}$ of 9 μs. $T_f$ includes an idle slot duration Ts at the start thereof.

2. Random Access Procedure

Figure 8:
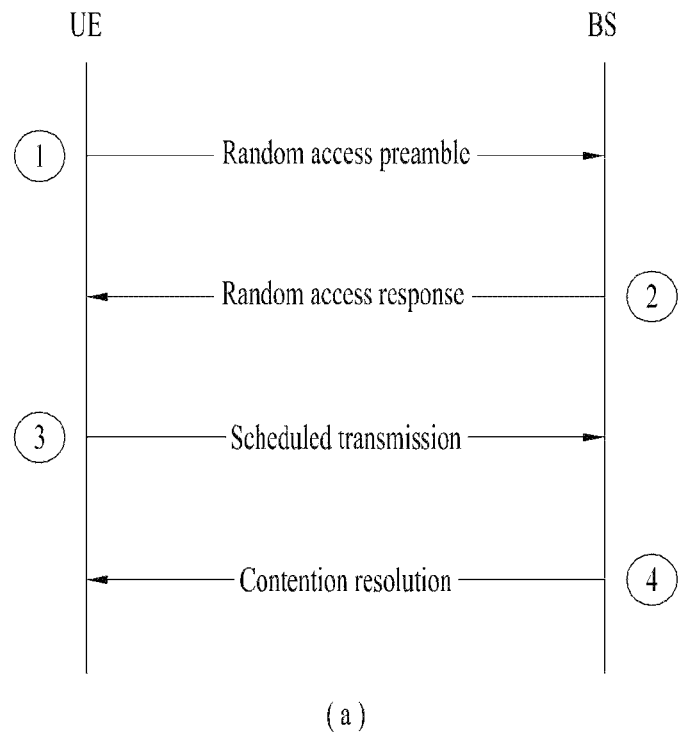
FIGS. 8 and 9 are diagrams illustrating a signal flow for a random access procedure.
Figure 8:
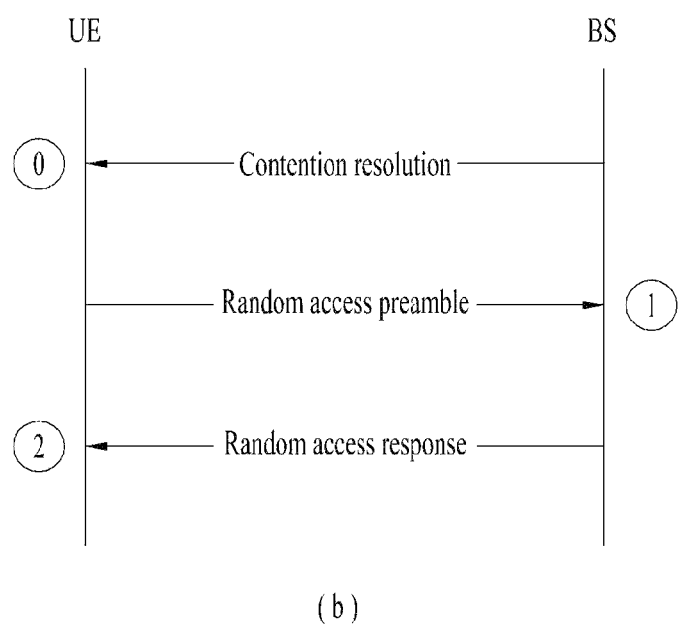

FIG. 8 illustrates random access procedures. FIG. 8(a) illustrates the contention-based random access procedure, and FIG. 8(b) illustrates the dedicated random access procedure.

Referring to FIG. 8(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-Response Window). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 8(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.

Step 1: The UE transmits the RACH preamble on a PRACH.

Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1 s, DCI format 1_0 is used as a PDCCH order indicating a random access procedure. In this case, the fields of DCI format 1_0 are configured as follows.

RA preamble index: 6 bits

UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.

SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.

PRACH mask index: 4 bits. When the bits of the RA preamble index are all non-zeroes, the PRACH mask index indicates an RACH occasion associated with the SSB indicated by the SSB index. Otherwise, it is reserved.

Reserved: 10 bits

When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ_feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 5

| Component | Description | Time (ms) |
| --- | --- | --- |
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |

TABLE 5-continued

| Component | Description | Time (ms) |
|---|---|---|
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

To reduce latency in a random access procedure, the 2-step random access procedure may be used in the present disclosure.

Figure 9:
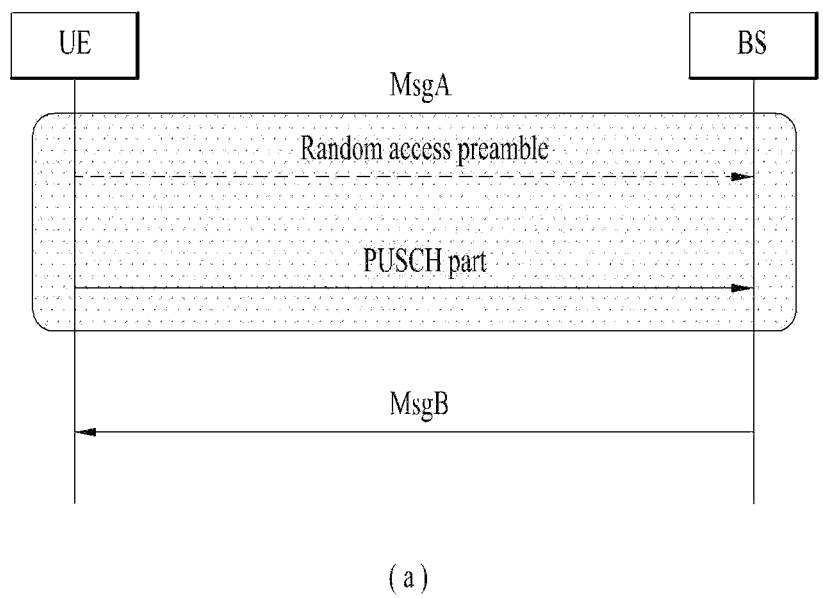
Figure 9:
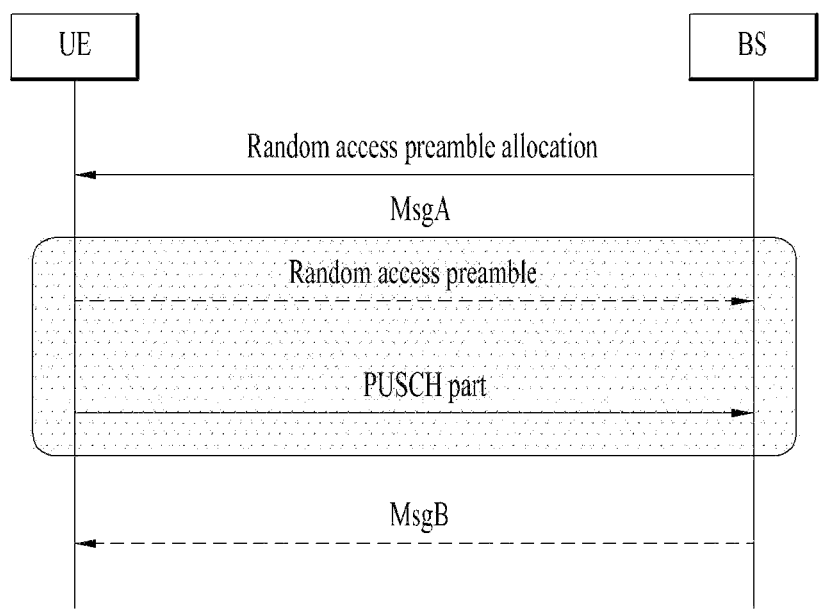

As illustrated in FIG. 9(a), the 2-step random access procedure may include two steps: transmission of a UL signal (referred to as MsgA) from the UE to the BS and transmission of a DL signal (referred to as MsgB) from the BS to the UE.

The following description focuses on the initial access procedure, but the proposed methods may be equally applied to the random access procedure after the UE and BS establish an RRC connection. Further, a random access preamble and a PUSCH part may be transmitted together in a non-contention random access procedure as shown in FIG. 9(b).

While not shown, the BS may transmit a PDCCH for scheduling MsgB to the UE, which may be referred to as an MsgB PDCCH.

3. Physical Random Access Channel (PRACH) Transmission in U-Band

The Wi-Fi standard (802.11ac) specifies a CCA threshold of −62 dBm for non-Wi-Fi signals and a CCA threshold of −82 dBm for Wi-Fi signals. In other words, if a station (STA) or access point (AP) of the Wi-Fi system transmits no signal in a specific band if the STA or AP receives a signal from a device not included in the Wi-Fi system in the specific band at a power of −62 dBm or higher.

Figures 10, 11:
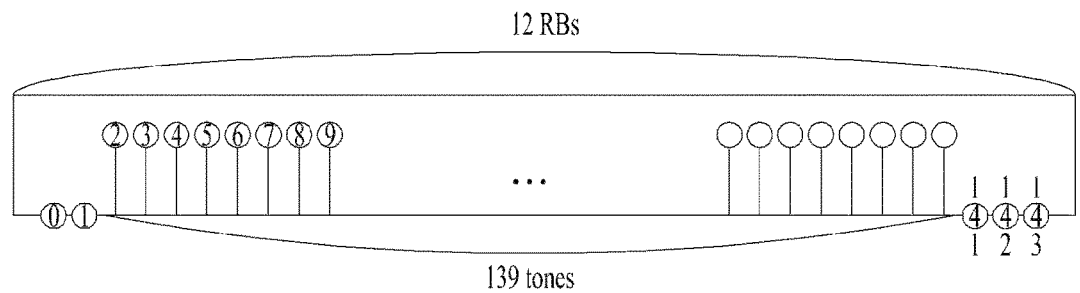
FIGS. 10 to 28 illustrate random access procedures according to an embodiment of the present disclosure.
Figure 12:
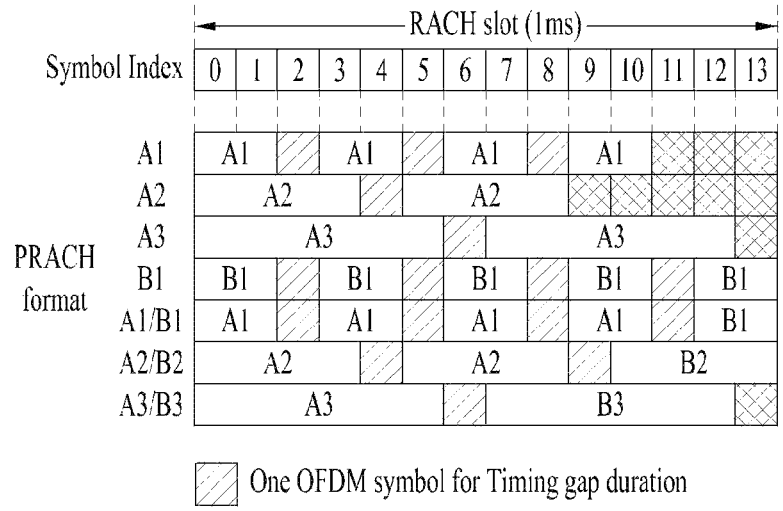
Figure 13:
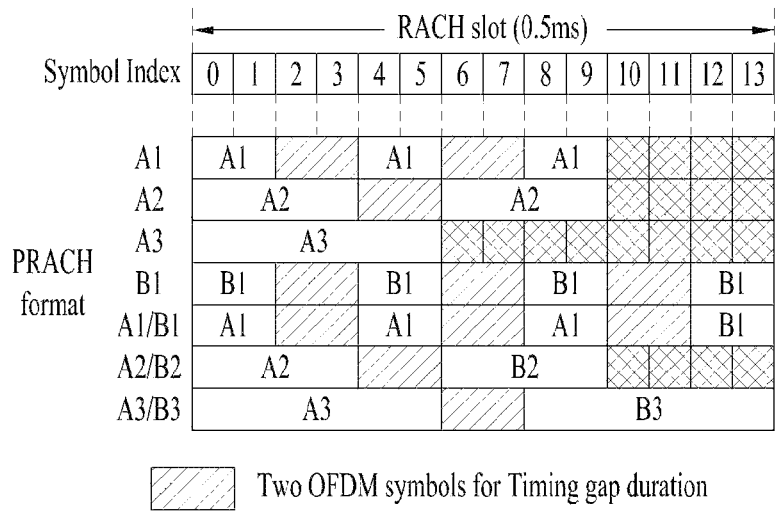
Figure 14:
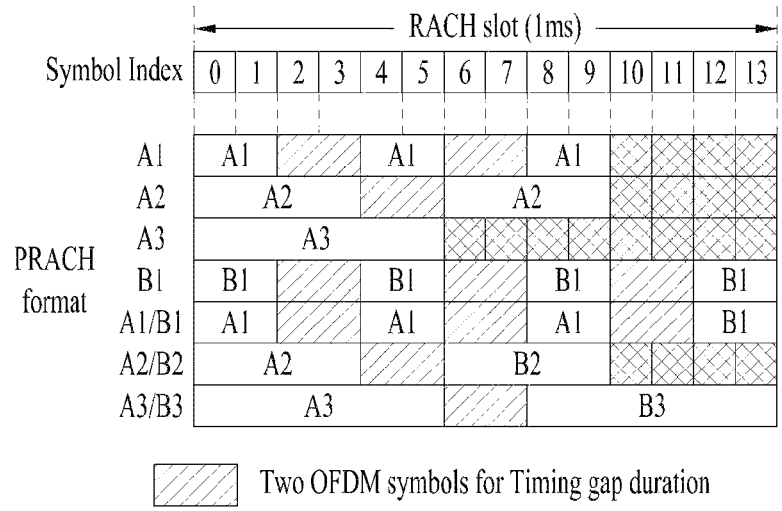
Figure 15:
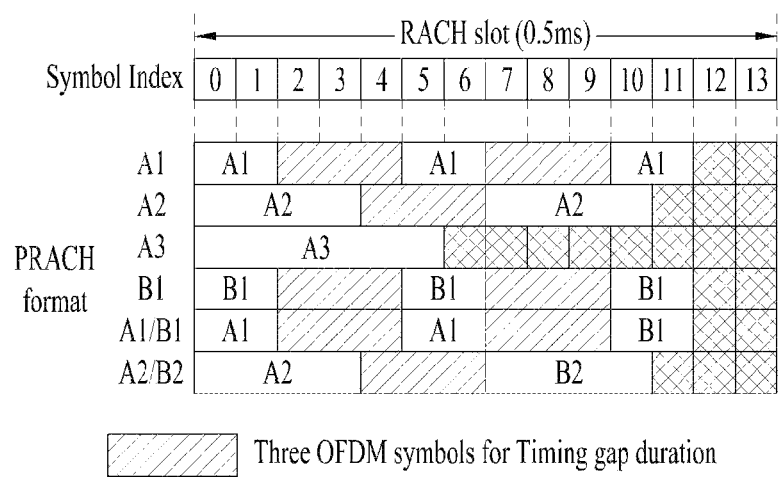

PRACH formats may include a long RACH format and a short RACH format. A PRACH with the long RACH format is configured with a length-839 sequence. A PRACH with the short RACH format is configured with a length-139 sequence. Hereinafter, the sequence structure of the short RACH format will be described. For frequency range 1 (FR1) below 6 GHZ, the SCS of the short RACH format may be 15 and/or 30 KHz. The PRACH with the short RACH format may be transmitted in 12 RBs as shown in FIG. 10. The 12 RBs include 144 REs, and the PRACH may be transmitted over 139 tones (139 REs) of 144 REs. FIG. 10 shows that among 144 REs, two REs with the lowest indices and three REs with the highest indices are null tones, but the positions of the null tones may be different from those shown in FIG. 10.

In the present specification, a short RACH format may be referred to as a short PRACH format, and a long RACH format may be referred to as a long PRACH format. PRACH format may also be referred to as preamble format.

Short PRACH format may include values defined in Table 6.

TABLE 6

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $8 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C1 | 139 | $15 \times 2^\mu$ kHz | $4 \times 2048\kappa \times 2^{-\mu}$ | $2048\kappa \times 2^{-\mu}$ |

In Table 6, LRA is the length of the RACH sequence, ΔfRA is an SCS applied to RACH, and κ is denoted by "κ=Ts/Tc=64". In addition, u is denoted by $\mu \in \{0,1,2,3\}$, where μ is set to one of 0, 1, 2, and 3 depending on the SCS value. For example, for 15 kHz SCS, μ is set to '0', and for 30 kHz SCS, μ is set to '1'.

Formats B4, C0, and C1 from among PRACH formats shown in Table 6 may be PRACH formats designed for coverage larger than cell coverage considered in NR-U. In NR-U, PRACH formats A1 to B3 may be mainly used.

However, the methods proposed in the present disclosure can also be used in other use cases other than NR U-band. For example, as one example of the other use cases, methods proposed in the present disclosure can be used in an NR-based non-terrestrial network (NTN). In NTN, other PRACH formats other than PRACH formats A1 to B3 may be mainly used.

The base station (BS) may indicate which PRACH format can be transmitted at a specific time point for a specific duration through higher layer signaling, and may inform the corresponding slot of the number of ROs. Table 6.3.3.2-2 to Table 6.3.3.2-4 for use in 38.211 standard may correspond to the number of ROs. Table 7 shows, in Table 6.3.3.2-3 for use in 38.211 standard, only a few of indices from among all indices that can use some PRACH formats A1, A2, A3, B1, B2, and B3 alone or in combination thereof.

TABLE 7

| PRACH Configuration Index | Preamble format | $n_{SFN}$ mod x = y | | Subframe number | Starting symbol | Number of PRACH slots within a subframe | N#Z,899; number of time-domain PRACH occasions within a PRACH slot | N#Z,899; RACH duration |
|---|---|---|---|---|---|---|---|---|
| | | x | y | | | | | |
| 81 | A1 | 1 | 0 | 4, 9 | 0 | 1 | 6 | 2 |
| 82 | A1 | 1 | 0 | 7, 9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4, 9 | 0 | 1 | 2 | 6 |
| 128 | A3 | 1 | 0 | 7, 9 | 7 | 1 | 1 | 6 |
| 142 | B1 | 1 | 0 | 4, 9 | 2 | 1 | 6 | 2 |
| 143 | B1 | 1 | 0 | 7, 9 | 8 | 1 | 3 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 251 | A3/B3 | 1 | 0 | 4, 9 | 0 | 1 | 2 | 6 |
| 252 | A3/B3 | 1 | 0 | 7, 9 | 2 | 1 | 2 | 6 |

Referring to Table 7, it can be recognized how many ROs were defined in the RACH slot for each preamble format (i.e., the number of time-domain PRACH occasions within a PRACH slot shown in Table 7), and it can also be recognized how many OFDM (Orthogonal Frequency-Division Multiplexing) symbols were occupied by the PRACH preamble for each preamble format (i.e., PRACH duration in Table 7). In addition, since a starting symbol of the initial RO can be indicated for each preamble format, information indicating which one of time points of the corresponding RACH slot corresponds to the RO starting position can be communicated between the BS and the UE, and RO can be configured in different shapes according to the respective PRACH configuration index values shown in Table 7.

On the other hand, the device operating in the U-band may determine whether a channel scheduled to transmit a certain signal is in an idle state or in a busy state. If the channel is in the idle state, one or more signals may be transmitted through the corresponding channel. If the channel is in the busy state, the device scheduled for signal transmission may wait for a predetermined time until the channel switches to the idle state, and may then transmit signals. As previously described with reference to FIGS. 6 and 7, the above-mentioned operation may be referred to as LBT or a channel access scheme. In addition, LBT categories shown in Table 8 may exist.

TABLE 8

The channel access schemes for NR-based access for unlicensed spectrum can be classified into the following
categories:
Category 1: Immediate transmission after a short switching gap
This is used for a transmitter to immediately transmit after a switching gap inside a COT.
The switching gap from reception to transmission is to accommodate the transceiver turnaround time and is no longer than 16 μs.
Category 2: LBT without random back-off
The duration of time that the channel is sensed to be idle before the transmitting entity transmits is deterministic.
Category 3: LBT with random back-off with a contention window of fixed size
The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.
Category 4: LBT with random back-off with a contention window of variable size
The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

In case of LBT corresponding to Category 3 and LBT corresponding to Category 4, a backoff counter value may be selected randomly within a contention window (CW). LBT corresponding to Category 3 may be referred to as 'Cat 3 LBT', and LBT corresponding to Category 4 may be referred to as 'Cat 4 LBT'. In case of LBT corresponding to Category 3, a backoff counter value may be randomly selected based on the fixed contention window size value. In case of LBT corresponding to Category 4, the contention window size value may start from an initial minimum contention window size value, and may then increase by one step within the allowed candidates whenever the LBT fails in operation. A maximum value of the contention window size, a minimum value of the contention window size, and candidates of the allowed contention window size have been predefined for each channel access priority class (see Table 3 and Table 4). For example, in case of 'Cat 4 LBT' corresponding to the channel access priority class of 4, the UE may initially allow a backoff counter value to be randomly selected from among the range of 0 to 15. When the UE fails in LBT, the UE may allow a backoff counter value to be randomly selected from among the range of 0 to 31.

When the channel is in the idle state for '16+9×mp+K×9' μs, the UE having selected the backoff counter value based on values defined in Table 4 may perform UL transmission that is indicated and/or configured by the BS (where 'K' is a selected backoff counter value and 'mp' is a slot time applied to the channel access priority class). The channel access priority class and LBT categories for PRACH transmission are shown in Table 9.

that the time gap or the time gap duration is configured in the RACH slot may indicate that the time gap or the time gap duration is configured between two adjacent ROs included in the RACH slot. The time gap duration may be comprised of two or more different lengths and/or two or more different values. For example, assuming that the BS constructs a total of two RACH slot types including RACH slot type A and RACH slot type B, a time gap of X μs (or X OFDM symbols) is configured between the adjacent ROs configured in RACH slot type A, and a time gap of Y μs (or Y OFDM symbols) is configured between the adjacent ROs configured in RACH slot type B, where X and Y may be set to different values. For example, Y may be higher than X. If the BS constructs different types of RACH slots having different lengths of time gaps, the UE may select an appropriate type of RACH slots according to the UE-configured contention window size and/or the selected backoff counter value, and

TABLE 9

|  | Cat 2 LBT | Cat 4 LBT |
| --- | --- | --- |
| PUSCH (including at least UL-SCH with user plans data) | N/A except for the cases discussed in Note 2 below | Channel access priority class is selected according to the data |
| SRS-only | N/A | Cat4 with lowest channel access priority class value (as in LTE eLAA) |
| RACH-only | (see Note 2) | Cat4 with lowest channel access priority class value |
| PUCCH-only | (see Note 2) | Cat4 with lowest channel access priority class value |

Note 2:
Applicability of a channel access scheme other than Cat 4 for the following signals/channels have been discussed and details are to be determined when the specifications are developed:
UL control information including UC1 only on PUSCH, e.g. HARCpACK, Scheduling Request, and Channel State Information
Random Access Based on the values derived from Tables 8 and 9, if the channel is in the idle state for "16+9*2+K*9=34+K*9" (μs), the UE may start PRACH transmission. As described above, the backoff counter value K may be randomly selected within the contention window size that is size-varying.

In the legacy NR system, the RACH slot has been designed as a structure where there is no time gap between ROs as shown in Table 7. According to the legacy NR system, a specific situation where other ROs subsequent to a specific RO cannot be used may occur due to the presence of UEs that are scheduled to transmit the PRACH at a specific RO in the same cell. In the following description, when ROs are constructed in the RACH slot in the unlicensed band (U-band) environment, there is proposed a method for including a time gap between ROs. In the present disclosure, a time gap may refer to a time gap duration between ROs. As described above, the embodiments proposed for the U-band environment may be used in other use cases such as NTN.

3.1. Embodiment 1 (Method for Setting Time Gap Duration Between ROs to Different Values Between RACH Slots)

Different time gap durations may be configured between RACH slots constructed in one cell. Specifically, a time gap between two ROs configured to be adjacent to each other in the time domain within one RACH slot may be configured as a time section that has different lengths according to the respective RACH slots. In the present disclosure, two ROs adjacent to each other in the time domain may include not only ROs that are consecutive in the time domain, but also two ROs that are discontinuous in the time domain and do not include other elements other than the time gap. The fact may transmit the PRACH to the selected RACH slot. For example, when the contention window selected by the UE or the contention window indicated by the UE is large in size, the UE may select the RACH slot having a relatively large time gap. In addition, if K value selected by the UE is set to a high value, the UE may select the RACH slot having a relatively large time gap. When the contention window selected by the UE or the contention window indicated by the UE is small in size, the UE may select the RACH slot having a relatively small time gap. In addition, when K value selected by the UE is set to a low value, the UE may select the RACH slot having a relatively small time gap. Information about whether the contention window size and/or the K value is large or small can be determined by the UE based on a specific threshold.

The BS may indicate a time gap value to be used for a specific slot type in units of OFDM symbols and/or in units of a specific time (μs) through higher layer signaling. The higher layer signaling may be RRC signaling. Preferably, higher layer signaling may be SIB (System Information Block) and/or RMSI (Remaining Minimum System Information) from among RRC signaling. The BS may indicate a time gap configuration of X OFDM symbols (or X μs) in the RACH slot corresponding to an even-numbered slot index, and may indicate a time gap configuration of Y OFDM symbols (or Y μs) in the RACH slot corresponding to an odd-numbered slot index. In addition, the BS may indicate a time gap configuration of X OFDM symbols (or X μs) in the RACH slots configured in a subframe corresponding to an even-numbered subframe index, and may indicate a time gap configuration of Y OFDM symbols (or Y μs) in the RACH slots configured in a subframe corresponding to an odd-numbered subframe index. In addition, the BS may indicate a time gap configuration of X OFDM symbols (or X μs) in RACH slots configured in a radio frame corresponding to an even-numbered radio frame number, and may indicate a time gap configuration of Y OFDM symbols (or Y μs) in RACH slots configured in a radio frame corresponding to an odd-numbered radio frame index. A time gap may be set to a time gap between start points of ROs. For example, the time gap may be set to a time gap between a start time point of the previous RO and a start time point of the next RO within the time domain. In addition, the time gap may also be set to a time gap between the previous RO and the next RO in the time domain. For example, the time gap may be set to a time gap between the end time of the previous RO and the start time of the next RO in the time domain. When the BS indicates the time gap in units of a specific time (μs), the UE may recognize a minimum number of OFDM symbols equal to or greater than the indicated number of OFDM symbols to be a time gap, and may determine the positions of ROs and/or a gap between ROs based on the recognized time gap.

In addition, in a situation where the time gap duration for each PRACH configuration index is configured differently in the UE, the BS may indicate two or more PRACH configuration indexes for the UE. For example, in a situation where a time gap duration corresponding to PRACH configuration index #i includes X OFDM symbols and a time gap duration corresponding to PRACH configuration index #j includes Y OFDM symbols, if the BS desires to construct two types of RACH slots, the BS may allow the PRACH configuration index #i to be associated with the even-numbered slot index, and may allow the PRACH configuration index #j to be associated with the odd-numbered slot index. The slot index may be replaced with the subframe index or the radio frame index. The BS may construct two types of RACH slots in the same cell, and may configure PRACH configurations corresponding to both the PRACH configuration index #i and the PRACH configuration index #j for the UE through higher layer signaling. The UE may select one of the PRACH configurations, and may use the selected PRACH configuration. In the legacy NR system, only one PRACH configuration index may be indicated for the UE. In the present disclosure, two or more PRACH configuration indexes may be indicated for the UE.

The UE may receive information about PRACH configuration indexes through higher layer signaling, may select an appropriate RACH slot based on either the UE-configured contention window size and/or the UE-selected backoff counter value, and may transmit the PRACH through the selected RACH slot.

For example, the time gap duration may be set to two or more different values based on a specific time denoted by '16+9*$m_p$+K*9 μs' in which the UE should check whether a channel is in the idle state for PRACH transmission. If the channel access priority class of the RACH is set to 1, '$m_p$' may be set to 2, and the contention window size may be 3 or 7. If the contention window size is set to 3, the backoff counter value K may be set to any one of 0 to 3. If the contention window size is set to 7, the backoff counter value K may be set to any one of 0 to 7. In a state where two types of RACH slots having two different time gap durations are configured in a specific cell, a first time gap duration may be denoted by '16+9*2+3*9=61 μs' in consideration of a situation where the UE selects the highest backoff counter value. A second time gap duration may be denoted by '16+9*2+7*9=97 μs'. The time gap duration may be changed according to the PRACH format types. For example, PRACH format B has an implicit gap as compared to PRACH format A, so that the time gap duration of PRACH format B may be denoted by '16+9*$m_p$+K*9—implicit gap'. A value of the implicit gap for each PRACH format B may be set to 2.3 μs for PRACH format B1, may be set to 7.0 μs for PRACH format B2, may be set to 11.7 μs for PRACH format B3, and may be set to 25.8 μs for PRACH format B4.

When the UE-selected backoff counter value and/or the UE-configured contention window size is equal to or less than 3, the UE may select the RO that exists in the RACH slot having a relatively short time gap duration, and may transmit the PRACH preamble using the selected RO. In addition, when the UE-selected backoff counter value is in the range from 4 to 7, and/or when the UE-configured contention window size is set to 7, the UE may select the RO that exists in the RACH slot having a relatively long time gap duration, and may transmit the PRACH preamble. Generally, as the time gap duration increases, the number of ROs existing in the RACH slot may decrease.

In association with the time gap duration between ROs, the PRACH transmission start point and/or the PRACH transmission end point may be configured to be appropriate for the OFDM symbol boundary. In other words, the time gap duration may be set to a positive integer multiple of the OFDM symbol duration. In the legacy NR system, one OFDM symbol duration for use in a normal CP may be set to '(144+2048)*k*$2^{-u}$' according to SCS values. For example, one OFDM symbol duration may be set to 71.35 μs at SCS=15 kHz, and may be set to 35.68 μs at SCS=30 kHz.

Therefore, the value of the time gap duration configured based on the above-mentioned methods may be replaced with a minimum number of OFDM symbols equal to or greater than the corresponding value. For example, the value of the first time gap duration that is set to '16+9*2+3*9=61 μs' may be set to one OFDM symbol at SCS=15 kHz, or may be set to 2 OFDM symbols at SCS-30 kHz. The second time gap duration that is set to '16+9*2+7*9=97 μs' may be set to 2 OFDM symbols or 1.5 OFDM symbols at SCS=15 kHz, or may be set to 3 OFDM symbols at SCS=30 kHz. In 15 kHz SCS, the length of one OFDM symbol may be denoted by (144+2048)*k or 71.35 μs. In 30 kHz SCS, the length of one OFDM symbol may be denoted by (72+1024)*k or 35.68 μs. Alternatively, in association with the first time gap duration value or the second time gap duration value, a time gap between start points of the adjacent ROs may be replaced with a minimum number of OFDM symbols (or half OFDM symbols) that is equal to or greater than the sum of a PRACH format section and a specific time '61 μs' and/or the sum of a PRACH format section and a specific time '97 μs'.

In association with the PRACH format-based time gap duration, FIGS. 12 to 15 illustrate examples of ROs for PRACH formats A1, A2, A3, B1, A1/B1, A2/B2, and A3/B3. PRACH format AX/BY may indicate that PRACH format B is used only in the last RO belonging to the RACH slot and PRACH format A is used in the remaining ROs other than the last RO. For example, PRACH format A1/B1 may indicate that PRACH format B1 is used in the last RO belonging to the RACH slot and PRACH format A1 is used in the remaining ROs other than the last RO. FIGS. 12 to 15 illustrate that the start OFDM symbol position is assumed to be the OFDM symbol index '0'.

In addition, PRACH configuration information for enabling one BS to construct the RACH slot within the cell may be indicated through higher layer signaling, and may further indicate information about two or more different time gap durations as well as the PRACH configuration information. Higher layer signaling may be RRC signaling. Preferably, higher layer signaling may be SIB and/or RMSI from among RRC signaling. When two or more different time gap durations are indicated, the RACH slot configuration ratio for each time gap duration may be indicated through higher layer signaling. For example, the BS may indicate a PRACH configuration that constructs the RACH slot in the cell, may indicate a time gap duration #1 and a time gap duration #2 along with the PRACH configuration, and may further indicate the ratio of the time gap duration #1 and the time gap duration #2 required to configure the RACH slot. For example, the time gap duration #1 may be indicated by only one OFDM symbol duration, and the time gap duration #2 may be indicated by two OFDM symbol durations. The RACH slot configuration ratio of time gap duration #1 and time gap duration #2 may be denoted by 2:1. When the ratio of time gap duration #1 and time gap duration #2 is set to 2:1, the RACH slot configuration ratio may also be denoted by '(time gap duration #2)/(time gap duration #1)=2'.

Figure 16:
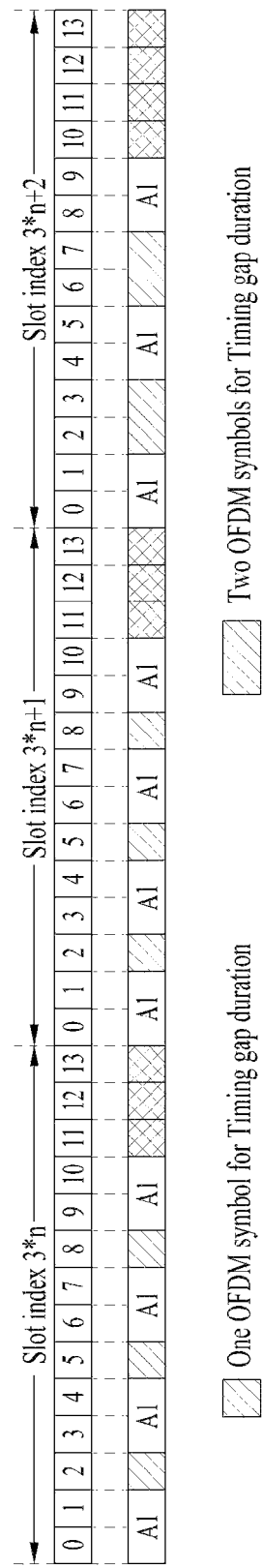

The UE may calculate the RACH slot and the RO configuration shape not only using the PRACH configuration information received from the UE, but also using two or more time gap duration values configured by the BS and/or two or more time gap duration ratios configured by the BS. For example, the RACH slot and the RO configuration shape can be calculated as shown in FIG. 16. In FIG. 16, the PRACH configuration may enable six ROs starting from start symbol #0 for each slot to have a preamble length corresponding to the length of 2 OFDM symbols, so that data transmission based on the PRACH format A1 can be indicated. Time gap duration #1 added to the PRACH configuration may be indicated by one OFDM symbol duration through the BS, time gap duration #2 may be indicated by two OFDM symbol durations through the BS, and the ratio of time gap duration #1 to time gap duration #2 may be denoted by 'r=(time gap duration #2)/(time gap duration #1)=2'. The UE may determine that a time gap duration corresponding to one OFDM symbol duration exists in the slots corresponding to Slot Index #0 and Slot Index #1, may determine the presence of 4 ROs starting from Start Symbol #0, and may transmit the PRACH preamble. The UE may determine that a time gap duration corresponding to two OFDM symbol durations exists in the slot corresponding to Slot Index #2, may determine the presence of 3 ROs starting from Start Symbol #0, and may transmit the PRACH preamble. In slots corresponding to the slot index denoted by '(slot index) modular 3=0 or 1', the UE may determine the presence of the time gap duration corresponding to one OFDM symbol duration in the same manner as slots corresponding to Slot Index #0 and Slot Index #1. In slots corresponding to the slot index denoted by '(slot index) modular 3=2', the UE may determine the presence of the time gap duration corresponding to one OFDM symbol duration in the same manner as the slot corresponding to Slot Index #2.

3.2. Embodiment 2 (Method for Configuring the Same Time Gap Duration Between ROs in RACH Slots Belonging to One Cell)

The same time gap duration may be configured between the adjacent ROs belonging to each RACH slot. Specifically, a time gap between two ROs adjacent to each other in a time domain belonging to one RACH slot may be set to a time section in which the respective RACH slots have the same length. The time gap duration may be set to a time section corresponding to '16+9×$m_p$ μs', may be set to a minimum number of OFDM symbols equal to or greater than '16+9×$m_p$ μs', or may be set to a minimum number of half-OFDM symbols equal to or greater than '16+9×$m_p$ μs'. A minimum number of half-OFDM symbols may correspond to a half of the minimum number of OFDM symbols equal to or greater than '16+9×$m_p$ μs'.

Figure 17:
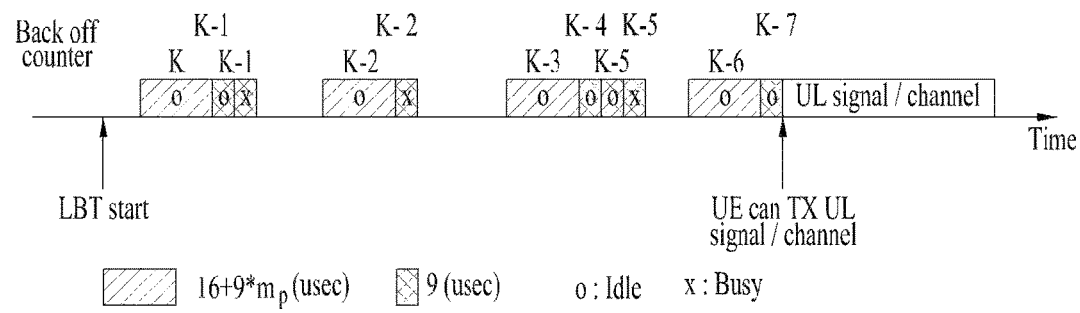
Figure 18:
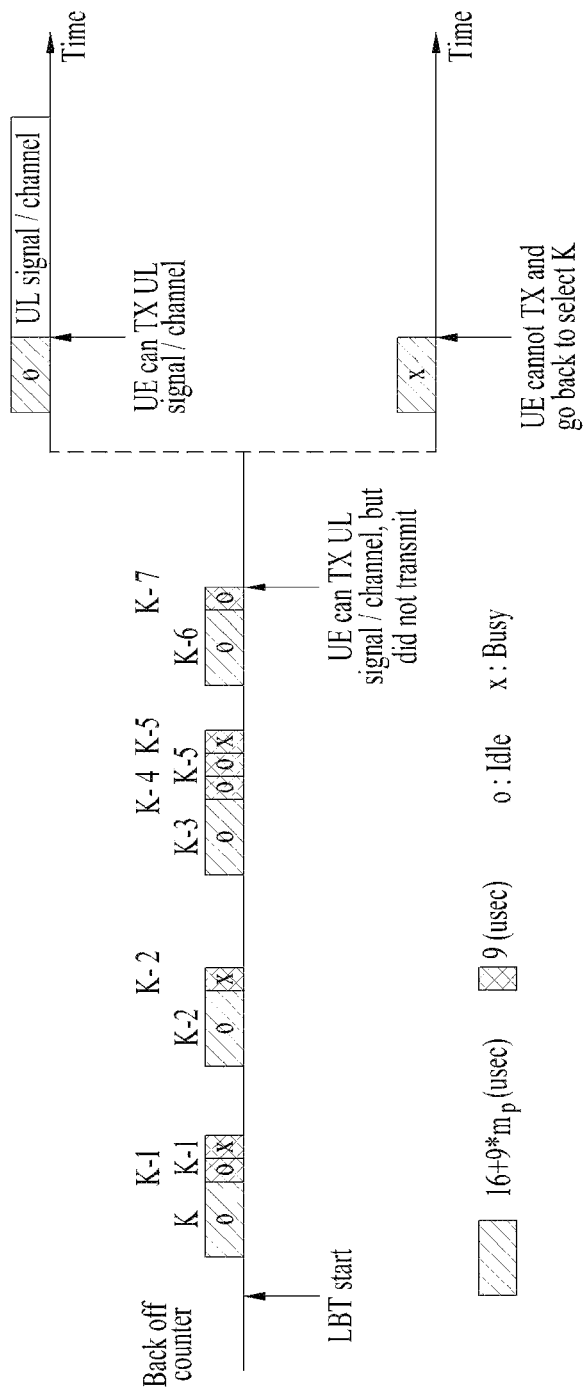

FIGS. 17 and 18 are diagrams illustrating examples of UL transmission for use in U-Band. The UE scheduled to perform UL transmission may select any one of available contention window size values for respective channel access priority classes according to LBT categories. The UE may allow only one value to be randomly selected as a backoff counter value K from among the contention window size values that begin to be selected from zero '0'. The UE may determine whether the channel is in the idle state for the initial time denoted by '16+9×$m_p$ μs'. When the channel is in the idle state, the UE may determine whether the channel is in the idle state K times at intervals of 9 μs. If the UE has confirmed that the channel is in the idle state during a first cycle of 9 μs, the backoff counter value may be reduced by one. Subsequently, the UE may determine whether the channel is also in the idle state during a second cycle of 9 μs subsequent to the first cycle. If the idle state of the channel has also been confirmed in the second cycle of 9 μs, the backoff counter value may be further reduced by one. If the channel is in the busy state, the backoff counter value is not reduced, and the UE should wait until the channel is in the idle state during the next time denoted by '16+9×$m_p$ μs'. Then, when the UE has confirmed that the channel is in the idle state during the cycle denoted by '16+9×$m_p$ μs', the UE may reduce the backoff counter value by one, and may then determine whether the channel is in the idle state during the next cycle of 9 μs subsequent to the above cycle '16+9×$m_p$ μs'. If the backoff counter value becomes zero through repetition of the above-mentioned processes, the UE may perform UL transmission.

Specifically, when a specific time where the backoff counter value becomes zero '0' is determined to be inappropriate for UL transmission, the UE may abandon UL transmission at the specific time. For example, when the specific time where the backoff counter value becomes zero '0' is not identical to a subframe boundary or a symbol boundary, it can be determined that the specific time where the backoff counter value becomes zero is not appropriate for UL transmission. Alternatively, when the specific time where the backoff counter value becomes zero is not identical to a time point instructed by the BS or is not identical to RO scheduled to be transmitted by the UE, it can be determined that the specific time where the backoff counter value becomes zero is not appropriate for UL transmission. When the UE having abandoned UL transmission after the backoff counter value becomes zero confirms that the channel is in the idle state during a predetermined cycle denoted by '16+9×$m_p$ μs' located immediately before a specific time point where the UE desires to perform UL transmission, the UE may perform UL transmission at the corresponding time point. When the UE has confirmed that the channel is in the busy state during the cycle denoted by '16+9×$m_p$ μs' located immediately before a desired time where the UE desires to perform UL transmission, the UE should again perform the selection and LBT procedure beginning from the contention window value.

As can be seen from FIGS. 17 and 18, after the UE adjusts the backoff counter value to be zero '0', the UE can transmit the PRACH through a specific RO after confirming that the channel is in the idle state during the cycle denoted by '16+9×$m_p$ μs' located before the specific RO. For example, assuming that the channel access priority for PRACH is set to 1, '$m_p$' may be set to 2, and the time gap duration between ROs may be set to 34 μs. The time gap duration may be changed according to PRACH format types. For example, assuming that PRACH format B has an implicit gap as compared to PRACH format A and the time gap duration proposed by Embodiment 2 is applied to PRACH format A, the time gap duration of PRACH format B may be denoted by '(time gap duration of PRACH format A)−(implicit gap)'. The implicit gap for each PRACH format B may be set to 2.3 μs for PRACH format B1, may be set to 7.0 μs for PRACH format B2, may be set to 11.7 μs for PRACH format B3, and may be set to 25.8 μs for PRACH format B4.

In association with the time gap duration between ROs, it may be desirable that the PRACH transmission start point and/or the PRACH transmission end point be configured to be suitable for the OFDM symbol boundary. In other words, the time gap duration may be set to a positive integer multiple of the OFDM symbol duration. In the legacy NR system, one OFDM symbol duration for use in CP may be set to '$(144+2048)*k*2^{-u}$' according to SCS values. For example, one OFDM symbol duration may be set to 71.35 μs at SCS=15 kHz, and may be set to 35.68 μs at SCS=30 kHz.

The time gap duration in units of us may be replaced with a minimum number of OFDM symbols equal to or greater than the corresponding value. For example, the value of the time gap duration may be set to one OFDM symbol or a half OFDM symbol at SCS=15 kHz, and may be set to one OFDM symbol at SCS=30 kHz. In 15 kHz SCS, the length of one OFDM symbol may be denoted by $(144+2048)*k$ or 71.35 μs, and the length of the half OFDM symbol may be denoted by $0.5*(144+2048)*k$ or $0.5*71.35$ μs. In 30 kHz SCS, the length of one OFDM symbol may be denoted by $(72+1024)*k$ or 35.68 μs. Alternatively, the value of the time gap duration may be replaced with a minimum number of OFDM symbols for enabling a time gap between start points of the adjacent ROs to be equal to or greater than the length corresponding to the sum of PRACH format duration and 34 μs.

Specifically, when the time gap between ROs or the time gap between RO start points is defined by the number of OFDM symbols, the time gap duration may be explicitly specified as one value regardless of SCS values when considering 15 kHz SCS and 30 kHz SCS. The time gap duration for a specific PRACH format may also be specified as one value regardless of SCS values. For example, when considering 15 kHz SCS and 30 kHz SCS, a time gap between ROs may be set to one OFDM symbol duration regardless of the SCS values. As another example, for PRACH format A1/B1, the time gap between RO start points may be set to 3 OFDM symbol durations regardless of the SCS values, when considering 15 kHz SCS and 30 KHz SCS. Alternatively, for PRACH format A1/B1, a time gap between RO start points at SCS=15 kHz may be set to 2.5 OFDM symbol durations, and a time gap between RO start points at SCS=30 kHz may be set to 3 OFDM symbol durations. As another example, for PRACH format A2/B2, when considering 15 kHz SCS and 30 kHz SCS, a time gap between RO start points may be set to 5 OFDM symbol durations regardless of SCS values. Alternatively, for PRACH format A2/B2, a time gap between RO start points at SCS=15 kHz may be set to 4.5 OFDM symbol durations, and a time gap between RO start points at SCS=30 kHz may be set to 5 OFDM symbol durations.

Figure 19:
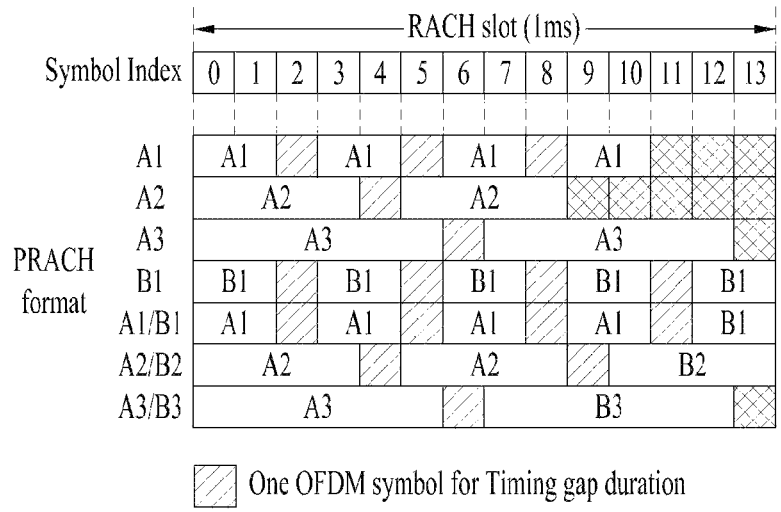
Figure 20:
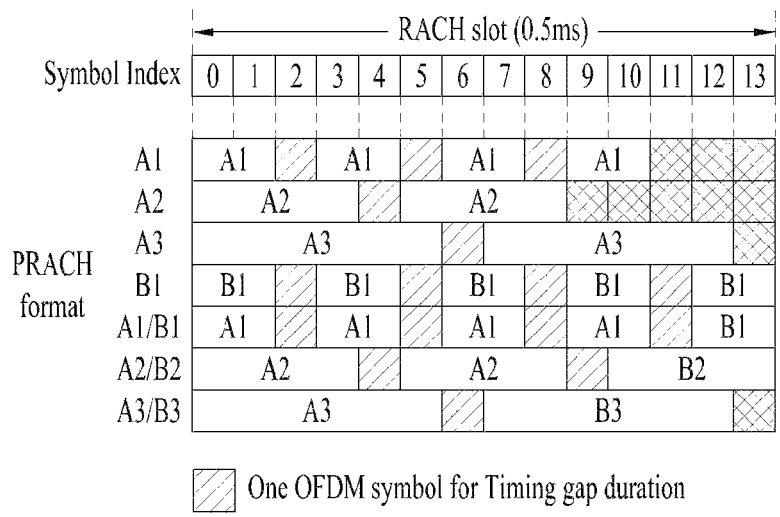

In association with PRACH format-based time gap duration, FIGS. 19 and 20 illustrate examples of ROs for PRACH formats A1, A2, A3, B1, A1/B1, A2/B2, and A3/B3. PRACH format AX/BY may indicate that PRACH format B is used only in the last RO belonging to the RACH slot and PRACH format A is used in the remaining ROs other than the last RO. For example, PRACH format A1/B1 may indicate that PRACH format B1 is used in the last RO belonging to the RACH slot and PRACH format A1 is used in the remaining ROs other than the last RO. FIGS. 19 and 20 illustrate that the start OFDM symbol position is assumed to be the OFDM symbol index '0'.

For the time gap duration, a power transient time required when the UE additionally transmits the PRACH may be further considered in an operation time for the UE's LBT. For example, the power transient time may be set to 10 μs. If a difference between a minimum number of OFDM symbol durations (equal to or greater than the calculated time gap duration) and a time gap duration between ROs actually calculated for the LBT procedure is less than the power transient time required when the UE transmits the PRACH, one OFDM symbol may be added to the last time gap duration that is finally determined.

For example, the time gap duration considering only the UE's LBT procedure may be set to 34 μs as described above. In 30 kHz SCS, one OFDM symbol corresponding to a minimum OFDM symbol length that is equal to or greater than 34 μs may be used as a time gap duration (where, the length of one OFDM symbol is denoted by $(72+1024)*k$ or 35.68 μs). When the power transient time as well as the LBT procedure time is further considered, the time gap duration may be set to 2 OFDM symbols or 1.5 OFDM symbols rather than 1 OFDM symbol. In 30 kHz SCS, the length of 2 OFDM symbols may be denoted by $2*(72+1024)*k$ or 71.35 μs.

3.3 Embodiment 3

Embodiment 3 may be an embodiment that can be commonly applied to Embodiment 1 and Embodiment 2. If the time gap duration is defined as shown in Embodiment 1 and/or Embodiment 2, the BS may instruct the UE to transmit the PRACH preamble at intervals of a predetermined time defined from the time point where the previous RO is ended. In addition, the BS may inform the UE of a time gap from the start point of the previous RO to the start point of the next RO. In addition, the BS may inform the UE of the number of OFDM symbols from the start point of the previous RO to the start point of the next RO. For example, assuming that RO corresponding to a specific PRACH format is defined to occupy A OFDM symbols, and a time gap duration between ROs is set to B OFDM symbols, the BS may inform the UE of not only a time point where the initial RO exists in the RACH slot, but also the number of OFDM symbols present between RO time points in the RACH slot. In other words, the BS may inform the UE of the number of A+B OFDM symbols. In Embodiment 3, information transferred from the BS to the UE may also be preconfigured in each of the BS and the UE. Based on the BS-instructed information that consists of both a time point where the initial RO exists and information about the OFDM symbols included in the next RO, the UE can calculate the number of ROs included in the RACH slot, and can correctly recognize the start point of each RO.

Figure 21:
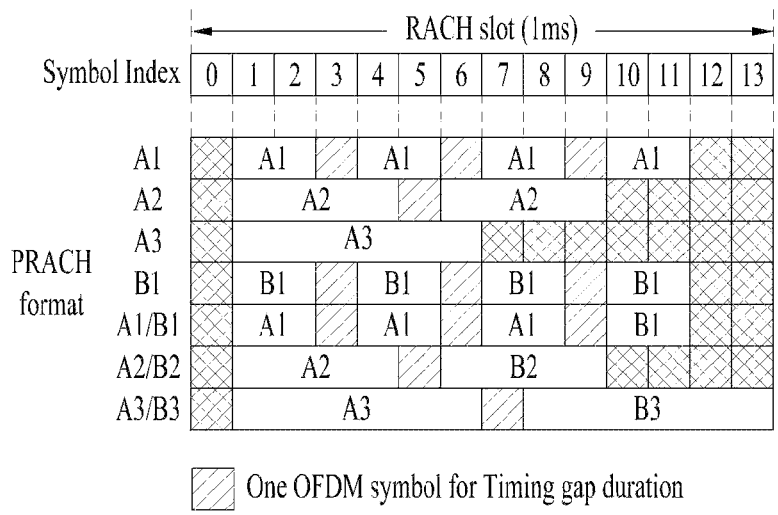
Figure 22:
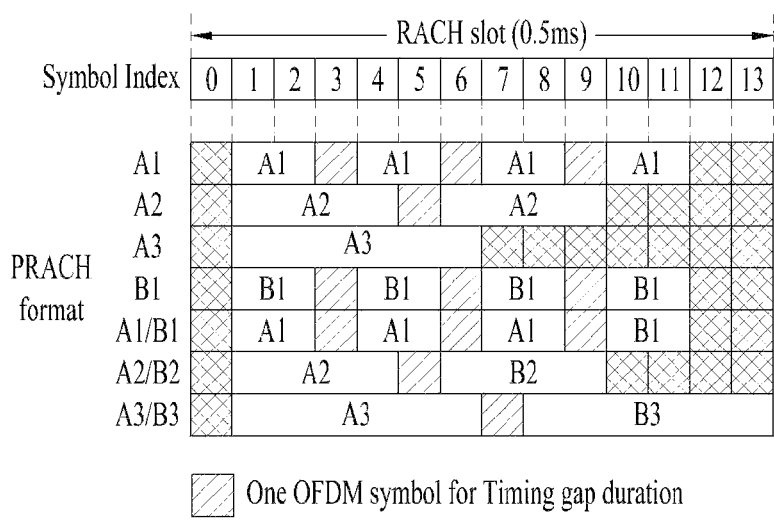

In all the methods proposed in Embodiments 1 to 3, a method for adding the time gap duration to a header (i.e., the front part) of the initial RO of a specific RACH slot may be considered. If the time gap duration is added to the header of the initial RO within the RACH slot, the probability of UE channel access may increase. FIGS. 21 and 22 illustrate that the time gap duration is added to the header of the initial RO of the RACH slot considered based on Embodiment 2. If the time gap duration is added to the header of the initial RO, the BS may inform the UE of not only a time point where the initial RO of the RACH slot exists, but also the number of OFDM symbols present between RO time points. In other words, the BS may inform the UE of the number of A+B OFDM symbols. In FIGS. 21 and 22, the time point where the first RO of the RACH slot exists may be set to a symbol corresponding to symbol index #1. Based on the BS-instructed information that consists of both a time point where the initial RO exists and information about the OFDM symbols included in the next RO, the UE can calculate the number of ROs present in the RACH slot, and can correctly recognize the start point of each RO.

Specifically, a method for adding the time gap duration to the header (i.e., the front part) of the initial RO may be applied in different ways according to PRACH format and/or PRACH configuration index. For example, in association with PRACH formats A1 and B1 where four ROs are guaranteed in the RACH slot, the time gap duration may not be configured in the header of the initial RO. In association with the remaining PRACH formats A2, A3, B2, and B3, the time gap duration may be configured in the header of the initial RO. The BS may inform the UE of information as to whether the time gap duration is located at the initial RO of the RACH slot through higher layer signaling. Higher layer signaling may be RRC signaling. Preferably, higher layer signaling may be SIB and/or RMSI from among RRC signaling.

In addition, the operation of changing the higher layer parameter value according to PRACH configuration indexes may be considered. Specifically, in a situation where the time gap duration between ROs described in Embodiments 1 to 3 is denoted by the number of OFDM symbols, when the number of OFDM symbols is denoted by $N_{gap}^{RA}$, gap, a 'PRACH with timing gap duration' parameter corresponding to the sum of the value ($N_{gap}^{RA}$) and the PRACH duration value from among higher layer parameters may be defined. In addition, each of the PRACH duration value and the time gap duration value may be represented through higher layer parameters.

When the sum of $N_{gap}^{RA}$ and the 'PRACH with timing gap duration' value is expressed in the PRACH duration, the 'PRACH with timing gap duration' value may also be denoted by a minimum number of OFDM symbols equal to or greater than the sum of a CP length, a symbol length, and the value of $N_{gap}^{RA}$.

Alt 1) If the 'PRACH with timing gap duration' value is set to X, PRACH preambles may be transmitted from the beginning of X OFDM symbol durations, and the remaining time duration may be used as a time gap duration. The PRACH preamble transmission duration may include a cyclic prefix (CP) and PRACH preamble symbols. In this case, the value of $N_{gap}^{RA}$ need not be additionally indicated, or need not be preconfigured in each of the BS and the UE. However, the last OFDM symbol of the RACH slot of PRACH format B may be emptied as a time gap duration.

Alt 2) If the 'PRACH with timing gap duration' value is set to X, $N_{gap}^{RA}$ OFDM symbol durations starting from the beginning of X OFDM symbol durations may be used as a time gap duration, and the PRACH preambles may begin to be transmitted from the next OFDM symbol. The PRACH preamble transmission duration may include the CP and PRACH preamble symbols. In this case, it is necessary for the value of $N_{gap}^{RA}$ to be indicated by the BS, or it is also necessary for the value of $N_{gap}^{RA}$ to be preconfigured, so that the probability of channel access of the UE desired to use the RO capable of being located at the header of the RACH slot can greatly increase. In the RACH slot composed of only PRACH format A, the number of ROs can be greatly reduced as compared to the other case in which the remaining time duration is set to a time gap duration.

Alt 3) Assuming that the PRACH duration value is set to Y and the time gap duration is set to $N_{gap}^{RA}$, the PRACH preamble may begin to be transmitted from the foremost part during Y OFDM symbol durations, and $N_{gap}^{RA}$ OFDM symbols may be used as a time gap duration. The PRACH preamble transmission duration may include the CP and the PRACH preamble symbols. In the time domain, the PRACH preamble may be located at the front stage, and the time gap duration may be located at the rear stage. In addition, the time gap duration may not be located after the last RO constructing the RACH slot. The BS may configure the start symbol to be equal to or greater than $N_{gap}^{RA}$. If the start symbol is equal to or greater than $N_{gap}^{RA}$, the probability of channel access of the initial RO of the RACH slot may increase. By means of the BS, information as to whether the start symbol is equal to or greater than $N_{gap}^{RA}$ may be applied in different ways according to the PRACH configuration indexes.

The operations shown in Alt 1 to Alt 3 may be combined with each other.

For example, the parameters of the PRACH configuration indexes based on Alt 1 may be represented as shown in Table 10. Table 10 shows an example of the case in which the method of 'Alt 1' is applied to some of PRACH configuration indexes shown in Table 7, and 'Alt 1' can be applied to PRACH configuration indexes not shown in Table 10. In Table 10, $N_{gap}^{RA}$ may be set to 1 (i.e., $N_{gap}^{RA}=1$).

TABLE 10

| PRACH Configuration Index | Preamble format | $n_{SFN}$ mod x = y | | Subframe number | Starting symbol | Number of PRACH slots within a subframe | N#Z,899; number of time-domain PRACH occasions within a PRACH slot | N#Z,899; +$N_{gap}^{RA}$ PRACH with timing gap duration |
|---|---|---|---|---|---|---|---|---|
| | | x | y | | | | | |
| 81 | A1 | 1 | 0 | 4, 9 | 0 | 1 | 4 | 3 |
| 82 | A1 | 1 | 0 | 7, 9 | 7 | 1 | 2 | 3 |
| 100 | A2 | 1 | 0 | 9 | 9 | 1 | 1 | 5 |
| 101 | A2 | 1 | 0 | 9 | 0 | 1 | 2 | 5 |

TABLE 10-continued

| PRACH Configuration Index | Preamble format | $n_{SFN}$ mod x = y | | Subframe number | Starting symbol | Number of PRACH slots within a subframe | N#Z,899; number of time-domain PRACH occasions within a PRACH slot | N#Z,899; +$N_{gap}^{RA}$ PRACH with timing gap duration |
|---|---|---|---|---|---|---|---|---|
| | | x | y | | | | | |
| 127 | A3 | 1 | 0 | 4, 9 | 0 | 1 | 2 | 7 |
| 128 | A3 | 1 | 0 | 7, 9 | 7 | 1 | 1 | 7 |
| 142 | B1 | 1 | 0 | 4, 9 | 2 | 1 | 4 | 3 |
| 143 | B1 | 1 | 0 | 7, 9 | 8 | 1 | 2 | 3 |
| 221 | A1/B1 | 1 | 0 | 4, 9 | 2 | 1 | 4 | 3 |
| 222 | A1/B1 | 1 | 0 | 7, 9 | 8 | 1 | 2 | 3 |
| 235 | A2/B2 | 1 | 0 | 4, 9 | 0 | 1 | 2 | 5 |
| 236 | A2/B2 | 1 | 0 | 7, 9 | 4 | 1 | 2 | 5 |
| 251 | A3/B3 | 1 | 0 | 4, 9 | 0 | 1 | 2 | 7 |

Figure 23:
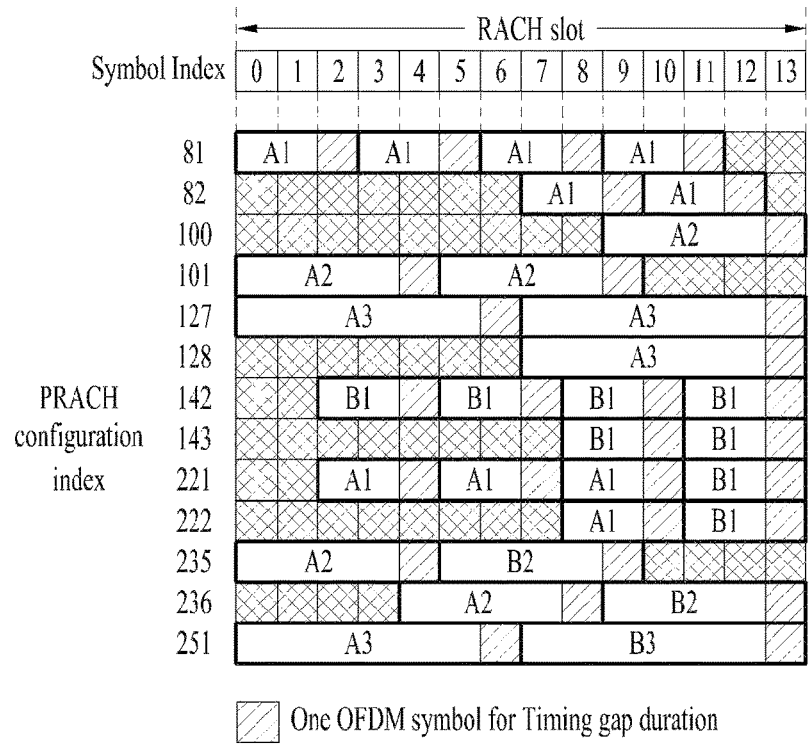

The example of Table 10 is illustrated in FIG. 23.

For example, the parameters changed depending on the PRACH configuration index based on Alt 2 are shown in Table 11. Table 11 shows an example of the case in which the Alt 2 method is applied to some of the PRACH configuration indexes shown in Table 7, and the Alt 2 method can also be applied to PRACH configuration indexes not shown in Table 11. In Table 11, $N_{gap}^{RA}$ may be set to 1 (i.e., $N_{gap}^{RA}=1$).

index is set to 128 may be changed as compared to Table 10. The fact that the PRACH format A is not transmitted may be considered in the last OFDM symbol of the RACH slot comprised of multiple PRACH formats A, so that the number of ROs may be reduced or the number of start symbols may be reduced by one symbol.

For example, the parameters changed depending on the PRACH configuration index based on Alt 3 are shown in Table 12. Table 12 shows an example of the case in which

TABLE 11

| PRACH Configuration Index | Preamble format | $n_{SFN}$ mod x = y | | Subframe number | Starting symbol | Number of PRACH slots within a subframe | N#Z,899; number of time-domain PRACH occasions within a PRACH slot | N#Z,899; +$N_{gap}^{RA}$, PRACH with timing gap duration |
|---|---|---|---|---|---|---|---|---|
| | | x | y | | | | | |
| 81 | A1 | 1 | 0 | 4, 9 | 0 | 1 | 4 | 3 |
| 82 | A1 | 1 | 0 | 7, 9 | 7 | 1 | 2 | 3 |
| 100 | A2 | 1 | 0 | 9 | 9 | 1 | 1 | 5 |
| 101 | A2 | 1 | 0 | 9 | 0 | 1 | 2 | 5 |
| 127 | A3 | 1 | 0 | 4, 9 | 0 | 1 | 1 | 7 |
| 128 | A3 | 1 | 0 | 7, 9 | 6 | 1 | 1 | 7 |
| 142 | B1 | 1 | 0 | 4, 9 | 2 | 1 | 4 | 3 |
| 143 | B1 | 1 | 0 | 7, 9 | 8 | 1 | 2 | 3 |
| 221 | A1/B1 | 1 | 0 | 4, 9 | 2 | 1 | 4 | 3 |
| 222 | A1/B1 | 1 | 0 | 7, 9 | 8 | 1 | 2 | 3 |
| 235 | A2/B2 | 1 | 0 | 4, 9 | 0 | 1 | 2 | 5 |
| 236 | A2/B2 | 1 | 0 | 7, 9 | 4 | 1 | 2 | 5 |
| 251 | A3/B3 | 1 | 0 | 4, 9 | 0 | 1 | 2 | 7 |

The example of Table 11 is illustrated in FIG. 23. The start symbol for use in the case where the PRACH configuration index is set to 100, the number of ROs (or the number of POs; the number of PRACH occasions) in a time domain belonging to the PRACH slot for use in the case where the PRACH configuration index is set to 127, and the start symbol for use in the case where the PRACH configuration the Alt 3 method is applied to some of the PRACH configuration indexes shown in Table 7, and the Alt 3 method can also be applied to PRACH configuration indexes not shown in Table 11. In Table 12, $N_{gap}^{RA}$ may be set to 1 (i.e., $N_{gap}^{RA}=1$).

TABLE 12

| PRACH Configuration Index | Preamble format | $n_{SFN}$ mod x = y | | Subframe number | Starting symbol | Number of PRACH slots within a subframe | N#Z,899; number of time-domain PRACH occasions within a PRACH slot | #Z,899; PRACH duration | $N_{gap}^{RA}$, Timing gap duration |
|---|---|---|---|---|---|---|---|---|---|
| | | x | y | | | | | | |
| 81 | A1 | 1 | 0 | 4, 9 | 1 | 1 | 4 | 2 | 1 |
| 82 | A1 | 1 | 0 | 7, 9 | 7 | 1 | 2 | 2 | 1 |
| 100 | A2 | 1 | 0 | 9 | 9 | 1 | 1 | 4 | 1 |
| 101 | A2 | 1 | 0 | 9 | 1 | 1 | 2 | 4 | 1 |
| 127 | A3 | 1 | 0 | 4, 9 | 0 | 1 | 2 | 6 | 1 |
| 128 | A3 | 1 | 0 | 7, 9 | 7 | 1 | 1 | 6 | 1 |
| 142 | B1 | 1 | 0 | 4, 9 | 0 | 1 | 5 | 2 | 1 |
| 143 | B1 | 1 | 0 | 7, 9 | 9 | 1 | 2 | 2 | 1 |
| 221 | A1/B1 | 1 | 0 | 4, 9 | 0 | 1 | 5 | 2 | 1 |
| 222 | A1/B1 | 1 | 0 | 7, 9 | 9 | 1 | 2 | 2 | 1 |
| 235 | A2/B2 | 1 | 0 | 4, 9 | 0 | 1 | 3 | 4 | 1 |
| 236 | A2/B2 | 1 | 0 | 7, 9 | 5 | 1 | 2 | 4 | 1 |
| 251 | A3/B3 | 1 | 0 | 4, 9 | 1 | 1 | 2 | 6 | 1 |

Figure 24:
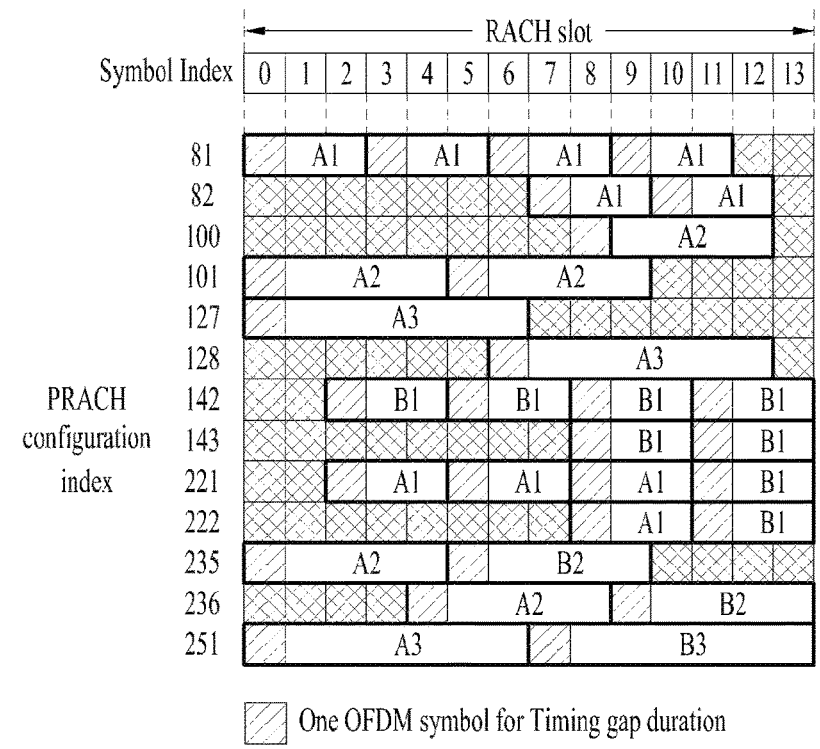
Figure 25:
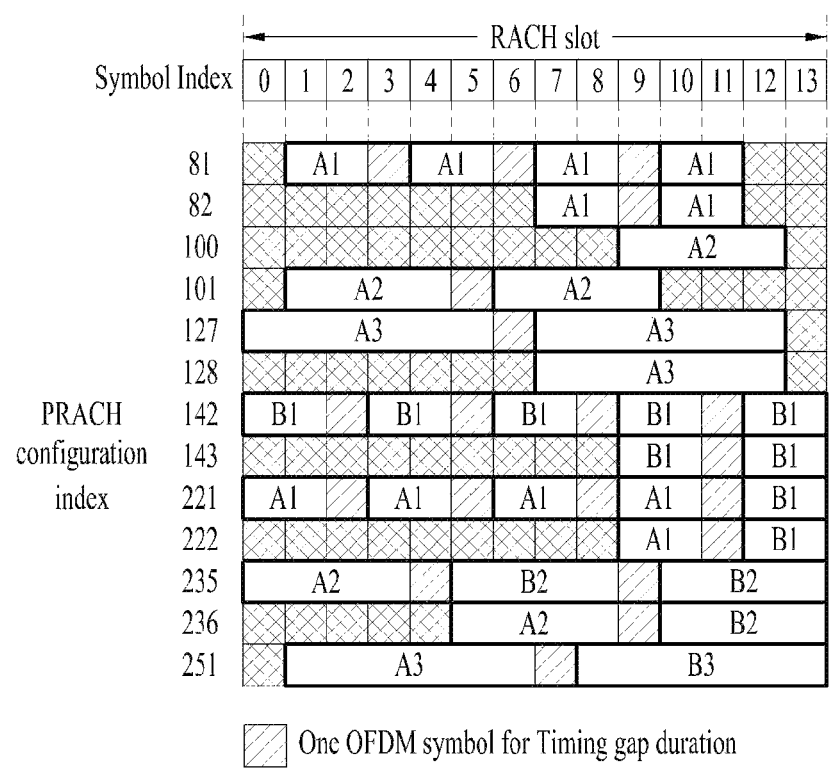
Figure 26:
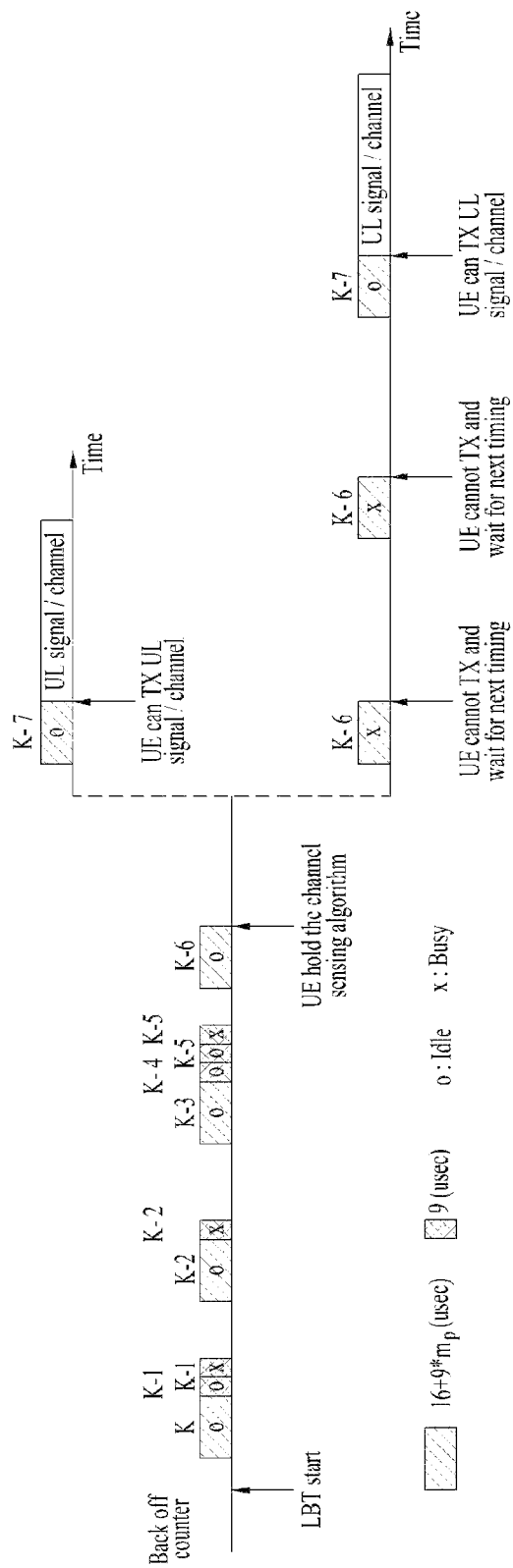

The example of Table 12 is illustrated in FIG. 24. The start symbol for use in the case where the PRACH configuration indexes are set to 81, 101, 142, 143, 221, 222, 236, 251, and the number of ROs (or the number of POs; the number of PRACH occasions) in a time domain belonging to the PRACH slot for use in the case where the PRACH configuration indexes are set to 142, 221 and 235 may be changed as compared to Table 10.

Examples of FIGS. 22 to 24 and Tables 10 to 12 illustrate various examples corresponding to the case of $N_{gap}^{RA}=1$. In the case where $N_{gap}^{RA}$ is equal to or greater than 1, the methods of Alt 1~Alt 3 can also be applied to the case of $N_{gap}^{RA}=1$. In addition, the value of NBA, may also be indicated differently according to the PRACH configuration index values.

3.4. Embodiment 4 (Enhanced Channel Access Procedure)

FIGS. 17 and 18 illustrate the LBT operations of the UE scheduled to transmit the UL channel and/or signals. In FIGS. 17 and 18, in a situation where the UE confirms the channel state at a specific time point, adjusts the backoff counter value K to be zero '0', and then abandons data transmission, if the UE confirms that the channel is in the idle state for a predetermined time ($16+9\times m_p$ μs) located just before the next time point desired by the UE, the UE may perform UL transmission at a second time point.

When the UE abandons data transmission at a specific time point and then desires to perform data transmission at the next time point desired by the UE, if the channel is in the busy state for the predetermined time ($16+9\times m_p$ μs) located just before the second time point, the UE should abandon UL transmission and should repeatedly perform the operations starting from the process of selecting the K value. This means that the UE does not actually perform data transmission after the K value reaches zero '0' through repeated execution of the LBT procedure, resulting in reduction in system throughput.

In order to address the above issues, the method of Embodiment 4 is proposed. The UE may adjust the backoff counter value to be set to '1' through the LBT procedure shown in FIGS. 17 and 18, and may temporarily stop the channel sensing operation. Thereafter, the UE may confirm the channel state during the cycle ($16+9\times m_p$ μs) located just before the UE-desired time point where the UE is scheduled to actually perform data transmission. If the channel is in the idle state, the UE may transmit UL signals and/or channels at the UE-desired time point where the UE is scheduled to actually perform data transmission. The UE may not perform the process of adjusting the K value to be zero and then abandoning data transmission, and may adjust the K value to be reduced to zero '0' under the condition that the channel state is in the idle state for the cycle ($16+9\times m_p$ μs) located just before the UE-desired time point where the UE is scheduled to actually perform data transmission. If the channel state is in the busy state for the cycle ($16+9\times m_p$ μs) located just before the UE-desired time point where the UE is scheduled to actually perform data transmission, the UE may wait for the next UE-desired time point without reducing the K value to zero '0'. The UE may repeatedly perform the operation of confirming whether the channel state is in the idle state for the cycle ($16+9\times m_p$ μs) located just before the next UE-desired time point where the UE is scheduled to actually perform data transmission.

If the UE has confirmed that the channel is in the idle state for the cycle ($16+9\times m_p$ μs) located just before the UE-desired time point where the UE is scheduled to actually perform data transmission, the UE may reduce the K value to be zero, and may transmit UL signals and/or channels at the corresponding time point, resulting in reduction in system throughput.

Although Embodiment 4 has been disclosed based on UL transmission, this operation can also be equally applied to the case where the BS transmits signals and/or channels to the UE. The BS may inform the UE of information as to whether the method of Embodiment 4 will be applied to specific signals and/or channels through higher layer signaling. In addition, the BS may inform the UE of information as to whether the method of Embodiment 4 will be applied to UL transmission and/or DL transmission through higher layer signaling. Higher layer signaling may be RRC signaling. Preferably, higher layer signaling may be SIB and/or RMSI from among RRC signaling.

3.5. Embodiment 5 (Timing Gap Duration at Slot Boundary)

Embodiments 1 to 4 have proposed the methods for allocating the time gap duration between ROs belonging to the RACH slot. In addition, assuming that the RO located at the last section of the RACH slot includes up to the last OFDM symbol of the RACH slot, in the UL slot for UL signals and/or UL channels to be present after the RACH slot, or in the DL slot for DL signals and/or DL channels to be present after the RACH slot, the corresponding RO may act as an interference factor for the LBT procedure to be performed by Tx/Rx devices (i.e., BS or UE). Thus, additional handling may be required to determine the position of the last RO of the RACH slot.

First, if the RO start OFDM symbol belonging to the RACH slot, the RO duration, and the time gap between ROs are included in the PRACH configuration indicated by the BS, the UE may recognize where the RO is located in the RACH slot through the PRACH configuration, and may recognize a total number of ROs existing in the corresponding slot through the PRACH configuration. In addition, the UE and the BS may be configured to perform the following additional operations.

Alt 1) The UE may set a predetermined time gap (that starts from the end time of the corresponding RACH slot and is configured to have a time section between ROs received from the BS) to the additional time gap. Thereafter, when all or some of the additional time gap and the predefined RO overlap each other in the time domain, the UE may determine that the corresponding RO is not used in the RACH process. As a result, the additional time gap may be allocated to the last section of the RACH slot without additional signaling of the BS. In addition, a sufficient amount of the LBT gap of the devices scheduled to perform UL/DL transmission (Tx) and reception(Rx) operations for the UL or DL slot to be located after the RACH slot can be guaranteed.

Alt 2) The UE may set a predetermined time (corresponding to K OFDM symbols (configured in the BS or predefined in the specification) starting from the end time of the corresponding RACH slot) to the additional time gap. Thereafter, when all or some of the additional time gap and the predefined RO overlap each other, the UE may determine that the corresponding RO is not used in the RACH process. As a result, the sufficient length of the LBT spacing between the devices scheduled to perform UL/DL Tx/Rx operations can be guaranteed in the UL or DL slot to be located after the RACH slot. In addition, the additional time gap may be flexibly configured through BS additional signaling.

In Embodiment 5, when a specific RO mapped according to specific rules is located across two different slots, the operation (e.g., RO selection is performed in a state where the corresponding invalid RO is excluded) may be performed in the situation where the corresponding RO is considered invalid. Accordingly, for the RO mapped to only one slot (regardless of the presence or absence of a subsequent time gap), the operation (e.g., RO is selectively performed with the corresponding RO) may be performed in the situation where the corresponding RO is considered invalid.

And/or, when a specific RO mapped according to specific rules starts from the end boundary of the RACH slot and is located after the previous time of a time section that is set to a time gap between ROs (or when the distance between the slot boundary and the RO ending time point is shorter than the time gap between ROs), the operation (e.g., RO selection is performed in the situation where the corresponding invalid RO is excluded) may be performed in a situation where the corresponding RO is considered invalid.

And/or, when a specific RO mapped according to specific rules starts from the end boundary of the RACH slot and is located after the previous time of the additional time gap separately configured by the BS (or when the distance between the slot boundary and the RO ending time is shorter than the additional time gap), the operation (e.g., RO selection is performed in the situation where the corresponding invalid RO is excluded) may be performed in a situation where the corresponding RO is considered invalid.

Second, the BS may explicitly or implicitly inform the UE of not only the RO start OFDM symbol, the RO duration, and the time gap between ROs, but also the last time gap to be located at the last section of the RACH slot, through PRACH configuration. The BS may inform the UE of the above-mentioned information through the following methods.

Alt 1) The BS may inform the UE of the RO start OFDM symbol, the RO duration, the time gap between ROs, and the additional time gap defined from the end time of the RACH slot, so that the BS may also inform the UE of not only a total number of ROs included in the corresponding RACH slot, but also the position of the corresponding ROs. As a result, a sufficient length of the LBT spacing between the devices scheduled to perform UL/DL Tx/Rx operations can be guaranteed in the UL or DL slot to be located after the RACH slot. In addition, the UE should construct the PRACH configuration, so that no additional operations are required, resulting in reduction in UE implementation complexity.

Alt 2) The BS may inform the UE of the RO start OFDM symbol, the RO duration, the time gap between ROs, and a total number of ROs present in the corresponding RACH slot, and may implicitly inform the UE of the additional time gap that ranges from the end time of the corresponding RACH slot to the end time of the last RO. As a result, although the implicit spacing is small in size or does not exist, the UE may be configured to follow the BS instruction.

In addition, although the proposed methods have been disclosed based on the 4-step PRACH procedure, it should be noted that the proposed methods can be applied to the 2-step PRACH procedure. For example, although the embodiments of the present disclosure have disclosed the time gap for RO to which Msg1 is mainly transmitted to the 4-step PRACH procedure, it should be noted that the proposed embodiments can also be applied to the 2-step PRACH procedure either for a time gap about RO and PO (i.e., PUSCH occasion) to which MsgA (i.e., PRACH preamble+PUSCH) is transmitted or for one time gap corresponding to the sum of RO and PO.

Since examples of the above-described proposals can also be used as implementation methods of the present disclosure, it will also be apparent that the examples of the above-described proposals may be considered to be a kind of proposed methods. Although the above-described proposals can be implemented independently from each other, it should be noted that the above-described proposals can also be implemented as a combination (or a merged format) of some proposals. Rules can be defined in a manner that information about whether the above-described proposed methods are applied (or information about the rules of the proposed methods) can be signaled from the BS to the UE through pre-defined signaling (e.g., physical layer signaling or higher layer signaling).

The methods, embodiments, or descriptions for implementing the proposals of the present disclosure may be applied separately from each other or may be applied in combination with one or more methods (or embodiments or descriptions).

Implementation Examples

One or more operations from among the above-described operations may be organically combined to implement some embodiments.

Figure 27:
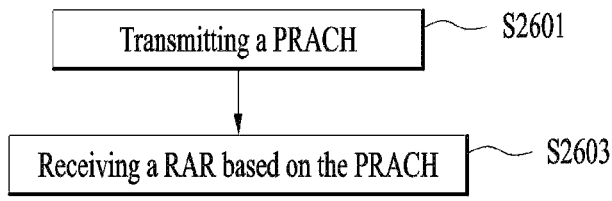

One of the embodiments that can be implemented by a combination of the above-described operations may be identical to those of FIG. 27.

The UE may transmit a PRACH to the BS (S2601), and may receive a RAR from the BS based on the PRACH (S2603). Although not shown in the drawings, from the viewpoint of the BS operation, the BS may receive a PRACH from the UE, and may transmit a RAR corresponding to the PRACH to the UE. At this time, the PRACH can be transmitted through one RO from among ROs included in the RACH slot.

In this case, the RACH slot structure may be proposed through the embodiments 1 to 5 of the present disclosure. For example, time gap durations may exist between the ROs included in the RACH slot. Values of the respective time gap durations (or the length values of the respective time gap durations) may be changed based on the PRACH configuration index for PRACH, SCS, and/or PRACH formats as described in Embodiment 1. Also, as described with reference to Embodiment 2, the respective time gap durations (or the length values of the respective time gap durations) may be kept constant regardless of the changes of the PRACH configuration index for PRACH, SCS, and/or PRACH format, as described in Embodiment 2. In other words, the respective time gap durations may be set to the same values regardless of the changes of the PRACH configuration index for PRACH, SCS, and/or PRACH format. The lengths of the respective time gap durations may be configured in units of OFDM symbols. For example, as described with reference to FIGS. 19 to 25, the length of each time gap duration may be identical to the length of one OFDM symbol.

Although the length of each time gap duration can be explicitly indicated and/or configured as described in Embodiment 3, it should be noted that the length of each time gap duration can also be implicitly derived based on information about the start time point of the initial RO from among ROs included in the RACH slot and information about the time duration from the start time of the initial RO to the start time of the second RO. Information about the initial RO start time from among ROs included in the RACH slot and information about the time duration from the initial RO start time to the second RO start time may be signaled from the BS to the UE. In addition, information about the initial RO start time from among ROs included in the RACH slot and information about the time duration from the initial RO start time to the second RO start time may be configured in each of the BS and the UE.

In addition, as described in FIGS. 19 to 24 and Embodiment 5, the time gap duration may be located before the initial RO start time point within the RACH slot, and/or may be located after the end time point of the last RO.

Prior to PRACH transmission, the UE may perform the channel access procedure. The channel access procedure may be performed based on the operations described in Embodiment 4. For example, the UE may randomly select the backoff counter value based on the contention window size, may reduce the backoff counter value one by one based on the fact that the U-band is in the idle state, and may transmit the PRACH through the RO when the backoff counter value reaches zero '0'. In this case, after the backoff counter value is reduced to '1', if the U-band is in the idle state for a predetermined time gap located just before the selected RO for PRACH transmission, the backoff counter value may be reduced to zero '0', and PRACH transmission is then performed. When the U-band of the UE is in the busy state for a predetermined time gap located just before the selected RO for PRACH transmission, the backoff counter value may be maintained at the value of 1, and PRACH transmission is not performed in the selected RO. The UE may select another RO for RACH transmission. When the U-band is in the idle state in the selected another RO, the backoff counter value may be reduced to zero '0', and the backoff counter value may be kept at the value of 1. When the backoff counter value is maintained, the UE may select still another RO. Therefore, the RO for allowing the UE to perform PRACH transmission may be configured in a manner that the LBT execution result obtained after the backoff counter value is reduced to '1' may be the RO staying in the idle state for a predetermined time located just before the corresponding RO. The predetermined time gap may be denoted by $(16+9^*m_p \text{ μs})$ as illustrated in Embodiment 4.

In addition to the above-described operation of FIG. 27, one or more of the operations described before with reference to FIGS. 1 to 26 may further be performed in combination.

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC_IDLE state, an RRC_INACTIVE state, and an RRC_CONNECTED stated. DRX is used for discontinuous reception of a paging signal in the RRC_IDLE state and the RRC_INACTIVE state. Now, DRX performed in the RRC_CONNECTED state (RRC_CONNECTED DRX) will be described below.

Figure 28:
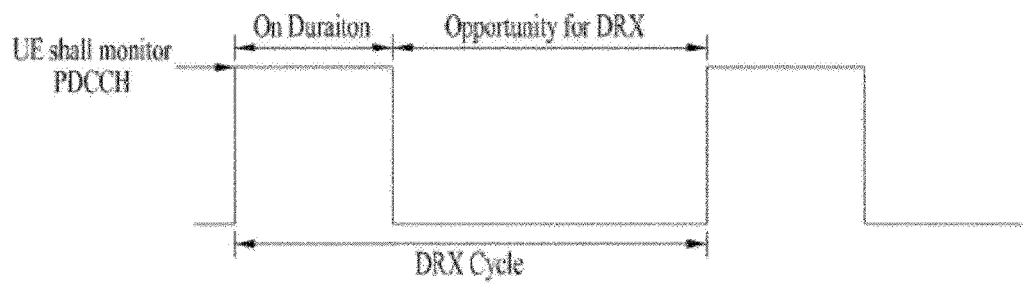

FIG. 28 is a diagram illustrating a DRX cycle (RRC_CONNECTED state).

Referring to FIG. 28, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 11 describes a UE operation related to DRX (in the RRC_CONNECTED state). Referring to Table 11, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 28.

TABLE 11

| | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the length of the starting duration of a DRX cycle.
- Value of drx-InactivityTimer: defines the length of a time duration in which the UE is in the awake state after a PDCCH occasion in which a PDCCH indicating initial UL or DL data has been detected.
- Value of drx-HARQ-RTT-TimerDL: defines the length of a maximum time duration from reception of a DL initial transmission to reception of a DL retransmission.
- Value of drx-HARQ-RTT-TimerDL: defines the length of a maximum time duration from reception of a grant for a DL initial transmission to reception of a grant for a UL retransmission.
- drx-LongCycleStartOffset: defines the time duration and starting time of a DRX cycle.
- drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Before the operations described above with reference to FIG. 27 (for example, before step S2601), the UE may perform DRX-related operations. The UE performs PDCCH monitoring during the ON duration. If the UE successfully detects any PDCCH during the PDCCH monitoring, the UE may perform at least one random access procedure according to embodiments of the present disclosure.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 29:
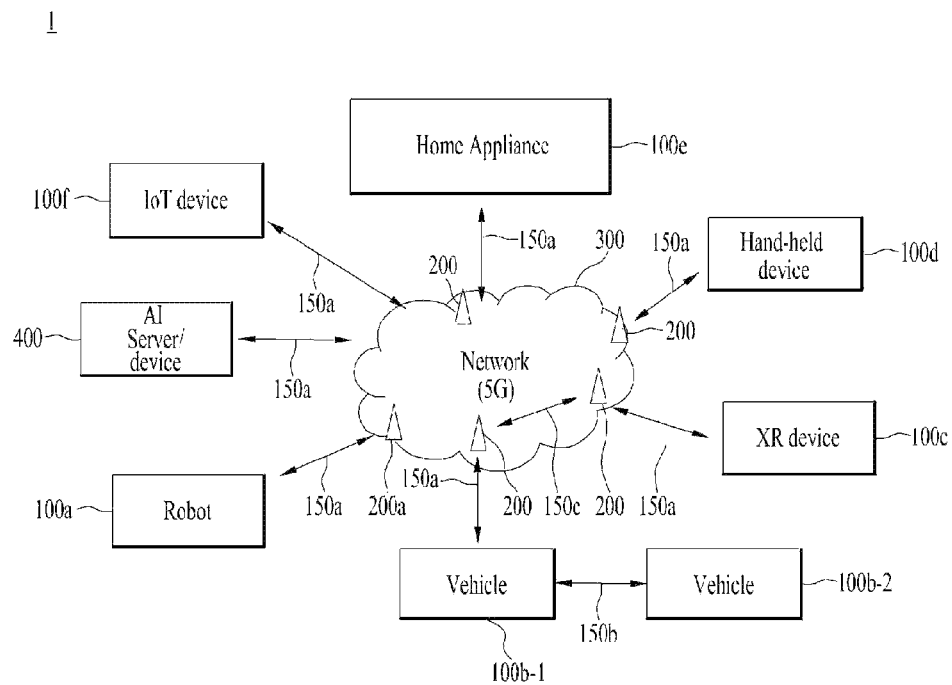
FIGS. 29 to 32 illustrate devices according to an embodiment of the present disclosure.

FIG. 29 illustrates a communication system 1 applied to the present disclosure.

Referring to FIG. 29, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c.

To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 30:
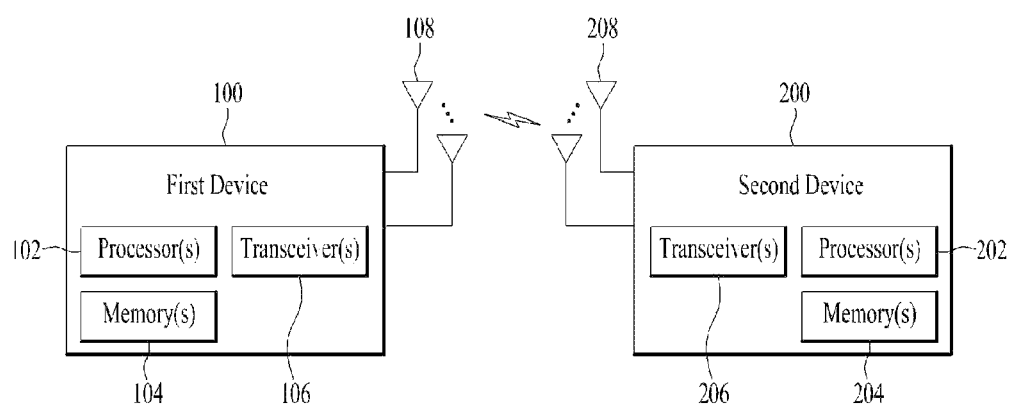

FIG. 30 illustrates wireless devices applicable to the present disclosure.

Referring to FIG. 30, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 29.

The first wireless device 100 may include one or more processors 102 and one or more memories 104, and further include one or more transceivers 106 and/or one or more antennas 108. The processor(s) 102 may control the memory (s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory (s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor (s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 31:
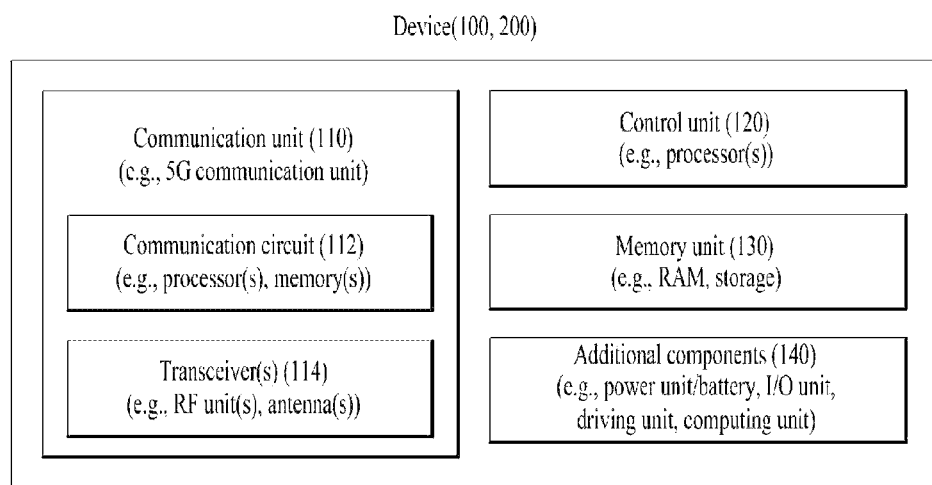

FIG. 31 illustrates another example of a wireless device applied to the present disclosure. The wireless device may be implemented in various forms according to a use case/service (refer to FIG. 29).

Referring to FIG. 31, wireless devices 100 and 200 may correspond to the wireless devices 100 and 200 of FIG. 30 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 30. For example, the transceiver(s) 114 may include the one or more transceivers 106 and 206 and/or the one or more antennas 108 and 208 of FIG. 30. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 29), the vehicles (100*b*-1 and 100*b*-2 of FIG. 29), the XR device (100*c* of FIG. 29), the hand-held device (100*d* of FIG. 29), the home appliance (100*e* of FIG. 29), the IoT device (100*f* of FIG. 29), a digital broadcasting terminal, a hologram device, a public safety device, an MTC device, a medical device, a FinTech device (or a finance device), a security device, a climate/environment device, the AI server/device (400 of FIG. 29), the BSs (200 of FIG. 29), a network node, or the like. The wireless device may be mobile or fixed according to a use case/service.

In FIG. 31, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 32:
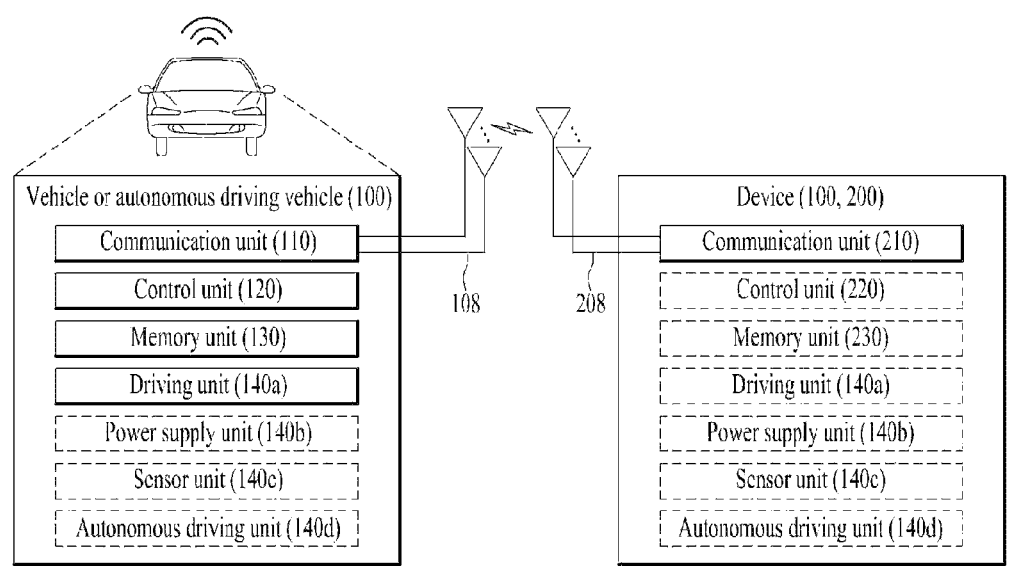

Example of vehicle or autonomous driving vehicle to which the present disclosure is applied FIG. 32 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 32, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 32, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method for a user equipment (UE) to transmit and receive signals in a wireless communication system, the method comprising:
   transmitting a physical random access channel (PRACH) on one RACH occasion (RO) from among a plurality of ROs included in a random access channel (RACH) slot; and
   receiving a random access response (RAR) based on the PRACH,
   wherein a time gap is configured between the plurality of ROs, and
   wherein the time gap is determined based on a start time point of a first RO among the plurality of ROs and a start time point of a second RO among the plurality of ROs.

2. The method according to claim 1, wherein the time gap is determined in units of orthogonal frequency division multiplexing (OFDM) symbols.

3. The method according to claim 1, wherein the transmitting the PRACH comprises:
   randomly selecting a backoff counter value based on a contention window size;
   reducing the backoff counter value incrementally based on information about an unlicensed band (U-band) that is in an idle state; and
   transmitting the PRACH on the one RO based on information indicating that the backoff counter value reaches zero '0',
   wherein:
   after the backoff counter value reaches '1', the backoff counter value is reduced to zero '0' based on the U-band being in the idle state during a predetermined time located just before the one RO, and
   after the backoff counter value reaches '1', the backoff counter value is kept at '1' based on the U-band being in a busy state during a predetermined time located just before the one RO.

4. A user equipment (UE) configured to transmit and receive signals in a wireless communication system, the UE comprising:
   at least one transceiver;
   at least one processor; and
   at least one memory operatively connected to the at least one processor, and configured to store instructions such that the at least one processor performs specific operations by executing the instructions,
   wherein the operations comprise:
   transmitting a physical random access channel (PRACH) on one RACH occasion (RO) from among a plurality of ROs included in a random access channel (RACH) slot; and
   receiving a random access response (RAR) based on the PRACH, wherein a time gap is configured between the plurality of ROs, and wherein the time gap is determined based on a start time point of a first RO among the plurality of ROs and a start time point of a second RO among the plurality of ROs.

5. The UE according to claim 4, wherein the time gap is determined in units of orthogonal frequency division multiplexing (OFDM) symbols.

6. The UE according to claim 4, wherein the transmitting the PRACH comprises:

randomly selecting a backoff counter value based on a contention window size;

reducing the backoff counter value incrementally based on information about an unlicensed band (U-band) that is in an idle state; and transmitting the PRACH on the one RO based on information indicating that the backoff counter value reaches zero '0', wherein:

after the backoff counter value reaches '1', the backoff counter value is reduced to zero '0' based on the U-band being in the idle state during a predetermined time located just before the one RO, and after the backoff counter value reaches '1', the backoff counter value is kept at '1' based on the U-band being in a busy state during a predetermined time located just before the one RO.

7. A device configured to operate for a user equipment (UE), the device comprising:

at least one processor; and at least one memory operatively connected to the at least one processor, and configured to store instructions such that the at least one processor performs specific operations by executing the instructions, wherein the specific operations include:

transmitting a physical random access channel (PRACH) on one RACH occasion (RO) from among a plurality of ROs included in a random access channel (RACH) slot; and receiving a random access response (RAR) based on the PRACH, wherein a time gap is configured between the plurality of ROs, and wherein the time gap is determined based on a start time point of a first RO among the plurality of ROs and a start time point of a second RO among the plurality of ROs.

8. The device according to claim 7, wherein the time gap is determined in units of orthogonal frequency division multiplexing (OFDM) symbols.

9. The device according to claim 7, wherein the transmitting the PRACH comprises:

randomly selecting a backoff counter value based on a contention window size;

reducing the backoff counter value incrementally based on information about an unlicensed band (U-band) that is in an idle state; and transmitting the PRACH on the one RO based on information indicating that the backoff counter value reaches zero '0', wherein:

after the backoff counter value reaches '1', the backoff counter value is reduced to zero '0' based on the U-band being in the idle state during a predetermined time located just before the one RO, and after the backoff counter value reaches '1', the backoff counter value is kept at '1' based on the U-band being in a busy state during a predetermined time located just before the one RO.

* * * * *